(12) United States Patent
Chivukula et al.

(10) Patent No.: US 11,468,181 B2
(45) Date of Patent: Oct. 11, 2022

(54) SECURE ACCESS TO ACCESSORY DEVICE RESOURCES

(71) Applicant: Microsoft Technology Licensing, LLC, Redmond, WA (US)

(72) Inventors: Ravi Kiran Chivukula, Saratoga, CA (US); Robert D. Young, Kirkland, WA (US); Nathan C. Sherman, Bellevue, WA (US); Chirag Shah, San Jose, CA (US); Brandon Records, Issaquah, WA (US); Astha Keshan, San Jose, CA (US); Eric Kotz, Seattle, WA (US); M. Nashaat Soliman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 214 days.

(21) Appl. No.: 16/854,793

(22) Filed: Apr. 21, 2020

(65) Prior Publication Data

US 2021/0326459 A1 Oct. 21, 2021

(51) Int. Cl.
*G06F 21/60* (2013.01)
*G06F 21/44* (2013.01)
(Continued)

(52) U.S. Cl.
CPC ............ *G06F 21/604* (2013.01); *G06F 21/44* (2013.01); *H04L 9/30* (2013.01); *H04L 9/3226* (2013.01);
(Continued)

(58) Field of Classification Search
CPC ..... G06F 21/604; G06F 21/44; H04L 63/205; H04L 63/10; H04L 9/3226; H04L 9/3247;
(Continued)

(56) References Cited

U.S. PATENT DOCUMENTS

| 8,238,811 B2 | 8/2012 | Lydon |
| 8,756,445 B2 | 6/2014 | Walsh et al. |

(Continued)

OTHER PUBLICATIONS

"International Search Report and Written Opinion Issued in PCT Application No. PCT/US2021/019142", dated May 17, 2021, 10 Pages.
(Continued)

*Primary Examiner* — Mohammad A Siddiqi
(74) *Attorney, Agent, or Firm* — Fiala & Weaver P.L.L.C.

(57) ABSTRACT

An accessory device receives authentication information from a host computing device connected thereto and determines whether the authentication information is valid. If the authentication information is valid, the accessory device applies a first access policy that specifies whether the accessory device can provide the host computing device with access to none, some, or all of various computing resources of the accessory device. If the authentication information is not valid, the accessory device applies a second access policy that is different than the first access policy. The accessory device can also be provisioned with access policies by a host computing device if the host computing device successfully authenticates with the accessory device. In either case, authenticating the host computing device may include verifying a digital signature of a certificate provided by the host computing device using a public key of a certificate authority that has been provisioned to the accessory device.

20 Claims, 18 Drawing Sheets

(51) Int. Cl.
    *H04L 9/32*     (2006.01)
    *H04L 9/30*     (2006.01)

(52) U.S. Cl.
    CPC .......... *H04L 9/3247* (2013.01); *H04L 9/3268* (2013.01)

(58) Field of Classification Search
    CPC ..... H04L 9/3268; H04L 9/30; H04L 63/0823; H04W 12/06
    See application file for complete search history.

(56) References Cited

U.S. PATENT DOCUMENTS

| | | | |
|---|---|---|---|
| 9,462,617 | B2 | 10/2016 | Glik et al. |
| 9,578,442 | B2 | 2/2017 | Dees et al. |
| 9,727,517 | B2 | 8/2017 | Engelen et al. |
| 9,946,300 | B2 | 4/2018 | Rosenberg et al. |
| 10,231,128 | B1 * | 3/2019 | Ziraknejad .............. H04W 4/02 |
| 2011/0299238 | A1 | 12/2011 | Radin et al. |
| 2013/0239172 | A1 * | 9/2013 | Murakami .............. H04L 63/20 726/1 |
| 2014/0199971 | A1 | 7/2014 | Totzke et al. |
| 2014/0229326 | A1 | 8/2014 | Carpenter et al. |
| 2016/0105289 | A1 | 4/2016 | Logue |
| 2016/0365984 | A1 * | 12/2016 | Lee ....................... H04L 9/3263 |
| 2018/0198628 | A1 * | 7/2018 | Hojsik .................. H04L 9/3247 |
| 2018/0198764 | A1 * | 7/2018 | Kumar .................. H04L 9/0838 |
| 2020/0304543 | A1 * | 9/2020 | Hamlin ................. H04L 63/108 |
| 2020/0344235 | A1 * | 10/2020 | Bhuiyan .............. H04L 63/0853 |
| 2021/0234877 | A1 * | 7/2021 | Prabhu .................... G06N 3/08 |

OTHER PUBLICATIONS

"Transform IT Service Delivery for your Modem Workplace", Retrieved from: https://web.archive.org/web/20200312212547/https://www.microsoft.com/en-us/microsoft-365/enterprise-mobility-security/microsoft-intune, Mar. 12, 2020, 5 Pages.

Rashid, Fahmida Y.., "Bringing Security to USB Type-C, Or More Limitations?", Retrieved from: https://duo.com/decipher/bringing-security-to-usb-type-c-or-more-limitations, Jan. 9, 2019, 3 Pages.

* cited by examiner

SECURE ACCESS TO ACCESSORY DEVICE RESOURCES

BACKGROUND

Accessory devices exist that provide a host computing device that is connected thereto with access to one or more computing resources. For example, a docking station, hub, multimedia adapter, or port replicator may provide a host computing device that is connected thereto with access to various computing resources such as one or more Universal Serial Bus (USB) ports, an Ethernet port, a video port, an audio port, or the like.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to securing access to computing resources of an accessory device to which a host computing device may be connected. In accordance with at least one embodiment, an accessory device receives authentication information from a host computing device that is connected thereto and determines whether the authentication information is valid. In response to at least determining that the authentication information is valid, the accessory device applies a first access policy that specifies whether or not the host computing device is to be provided access to each of one or more computing resources of the accessory device. In response to at least determining that the authentication information is not valid, the accessory device applies a second access policy that is different than the first access policy with respect to providing the host computing device with access to the one or more computing resources. In further embodiments, the authentication information received from the host computing device comprises at least a host certificate and the accessory device determines if the authentication information is valid by at least verifying a digital signature of the host certificate using a public key of a certificate authority that was previously provisioned to the accessory device.

Embodiments described herein are also directed to techniques for securely provisioning or modifying a host access policy on an accessory device. In accordance with such embodiments, the accessory device receives a host access policy management command and authentication information from a host computing device that is connected to the accessory device. The host access policy management command indicates that a host access policy be set on, modified on, or removed from the accessory device. The host access policy specifies whether a host computing device that is subsequently connected to the accessory device is to be provided access to each of one or more computing resources accessible to the accessory device. The accessory device determines if the authentication information is valid. In response to at least determining that the authentication information is valid, the accessory device executes the host access policy management command. In response to at least determining that the authentication information is not valid, the accessory device denies execution of the host access policy management command. In further embodiments, the authentication information received from the host computing device comprises at least an administrator certificate and the accessory device determines if the authentication information is valid by at least verifying a digital signature of the administrator certificate using a certificate authority that was previously provisioned to the accessory device.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the application and, together with the description, further explain the principles of the embodiments and to enable a person skilled in the relevant art(s) to make and use the embodiments.

Figure 1:
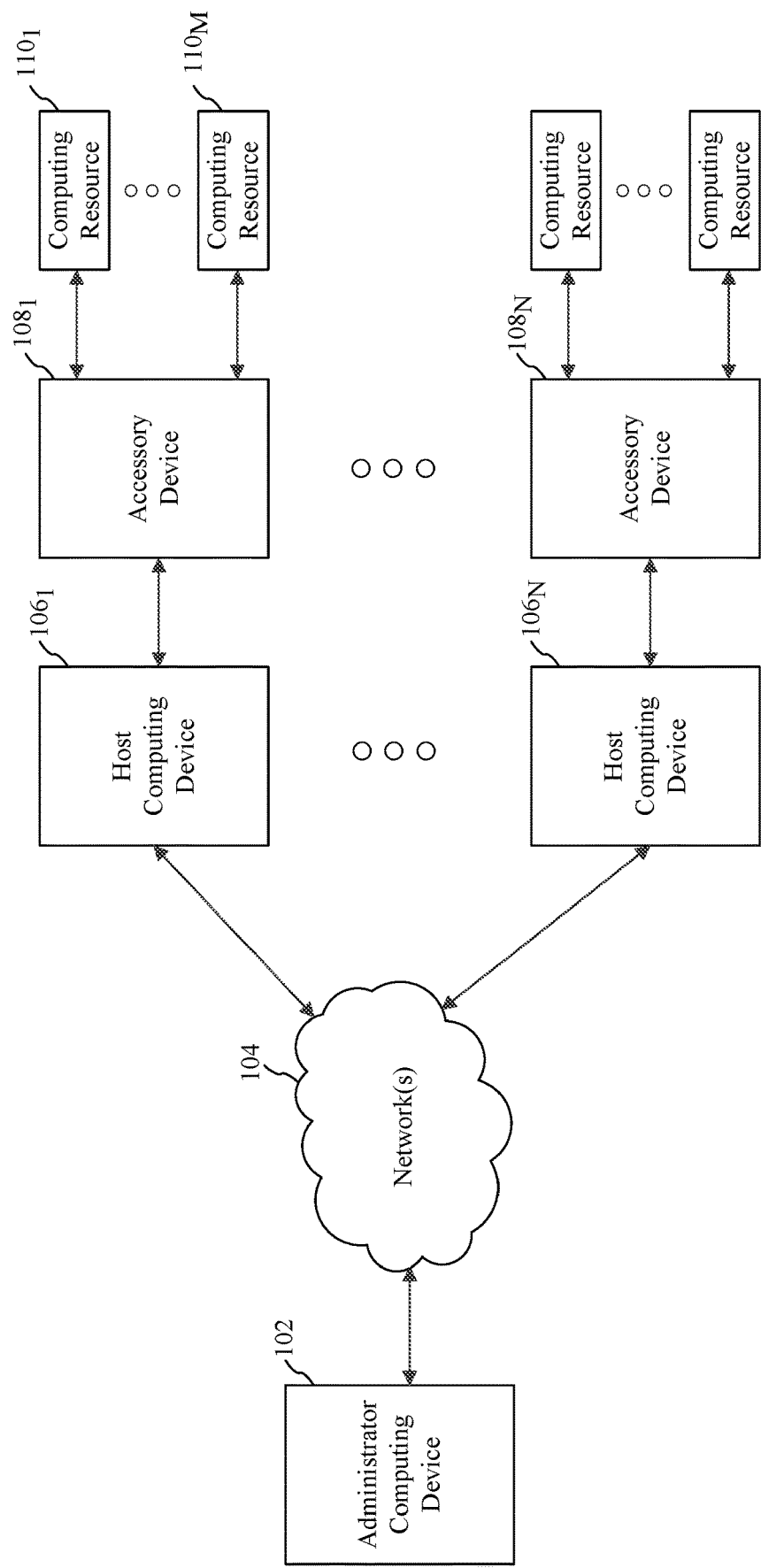
FIG. 1 depicts a system for securing access to one or more computing resources of one or more accessory devices in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes and are not limiting. The examples described herein may be adapted to any type of method or system for securing access to computing resources of an accessory device. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As noted in the Background Section, accessory devices exist that provide a host computing device that is connected thereto with access to one or more computing resources. For example, a docking station, hub, multimedia adapter, or port replicator may provide a host computing device that is connected thereto with access to various computing resources such as one or more USB ports, an Ethernet port, a video port, an audio port, or the like. If such an accessory device permits any host computing device that is connected thereto to access the computing resources, then those computing resources (and devices that are accessible via such computing resources) may be exploited. For example, if a malicious user connects her host computing device to an enterprise docking station and thereby accesses an enterprise network via an Ethernet port of the docking station, then that user may be able to steal information from enterprise computing devices connected to the network, install malware or spyware on such computing devices, and otherwise cause damage to the enterprise and its computing infrastructure.

To address this issue, embodiments described herein enable an accessory device to authenticate a host computing device that is connected thereto. If the host computing device passes authentication, then the accessory device applies a first access policy via which the host computing device is granted or denied access to each of one or more computing resources of the accessory device. However, if the host computing device fails authentication, then the accessory device applies a second access policy via which the host computing device is granted or denied access to each of the one or more one computing resources of the accessory device, wherein the second access policy is different than the first access policy in terms of which computing resources are made accessible to the host computing device. In an embodiment, the accessory device can leverage this approach to ensure that its computing resources are accessed only by approved host computing devices. This advantageously secures the computing resources themselves and, in a case where the computing resources are ports, secures any connected computing resources (e.g., computing devices accessible via the ports) from infiltration and/or attack by malicious users.

In accordance with further embodiments, an access policy enacted by the accessory device may include a separate access indication for each of multiple computing resources of the accessory device. This enables granular policy decisions to be made about which computing resources can be accessed by authenticated and unauthenticated host computing devices. For example, in accordance with one example access policy, an unauthenticated host computing device may be granted access to a video port and audio port of an accessory device but denied access to an Ethernet port of the accessory device. This enables very useful scenarios such as an enterprise allowing a guest user to connect a non-enterprise computing device to an enterprise docking station for limited purposes only—e.g., to stream content to enterprise audio/video devices, but not to connect to the enterprise network. Rather than making a single access decision for all accessory device computing resources, accessory devices described herein can advantageously implement policies that grant/deny access on a resource-by-resource basis.

In accordance with still further embodiments, an accessory device authenticates a host computing device by at least (1) validating a digital signature included in a host/administrator certificate that is provided by the host computing device to the accessory device, wherein such validating is performed using a public key of a certificate authority that has been provisioned to the accessory device; and (2) utilizing a public key included in the host/administrator certificate to validate a digitally-signed nonce that has also been provided by the host computing device. By utilizing such an approach, the accessory device need not include memory sufficient to store a whitelist of all approved host computing devices. Instead, it can identify each approved host computing device upon connection thereto by validating the host/administrator digital certificate and signed nonce provided by the host computing device. Furthermore, because the accessory device need only store the public key of the certificate authority, the accessory device need not include expensive secure storage elements that would otherwise be required if the authentication scheme required secrets (e.g., private keys) to be stored on the accessory device. Thus, such embodiments enable the accessory device to be designed more simply/cheaply and/or utilize fewer resources.

In accordance with yet further embodiments, if a host computing device is successfully authenticated by the accessory device in at least the manner described above, then the host computing device may be permitted to set, modify or remove an access policy on or from the accessory device. Likewise, the authenticated host computing device may be permitted to provision a new certificate authority to the accessory device. In this manner, the authentication capabilities and access policies of an accessory device can be flexibly modified over time as needed to handle a variety of secure access scenarios. In certain embodiments, authentication of the host computing device for the purposes of managing access polices and provisioning a certificate authority may further involve comparing an administrator Extended Key Usage (EKU) value included in the digital certificate sent from the host computing device to an administrator EKU value that is stored on the accessory device. In further embodiments, such authentication may further comprise comparing an identifier of the accessory device provided by the host computing device to an identifier of the accessory device that is stored on the accessory device, wherein such identifier is not programmatically queryable by any external device. Still other techniques may be utilized to authenticate the host computing device.

Further features and advantages of the embodiments, as well as the structure and operation of various embodiments, will be described in detail below with reference to the accompanying drawings. For example, FIG. 1 depicts a system 100 for securing access to one or more computing resources of one or more accessory devices in accordance with an embodiment. As shown in FIG. 1, system 100 includes an administrator computing device 102 that is communicatively connected to a plurality of host computing devices $106_1$-$106_N$ via one or more networks 104. Each host computing device $106_1$-$106_N$ is also connected to a corresponding accessory device $108_1$-$108_N$, and each accessory device includes or is connected to a plurality of computing resources. For example, as shown in FIG. 1, accessory device $108_1$ includes or is connected to computing resources $110_1$-$110_M$. Each of these components of system 100 will now be described.

Each of administrator computing device 102 and host computing devices $106_1$-$106_N$ is intended to represent a stationary computing device (e.g., a desktop computer), a mobile computing device (e.g., a laptop computer, a Microsoft Surface® device, a notebook computer, a tablet computer, or a netbook), or any other computing device with operational capabilities sufficient to perform the functions attributed to such devices as described herein. In accordance with one non-limiting example, administrator computing device 102 comprises a computing device that is assigned to, accessible to, and/or utilized by an information technology (IT) administrator of an enterprise, while host computing devices $106_1$-$106_N$ comprise other network-identifiable computing devices of the enterprise. However, persons skilled in the relevant art(s) will appreciate that the techniques described herein for securing accessory device computing resources are not limited to enterprise scenarios.

Network(s) 104 may include one or more of any of a local area network (LAN), a wide area network (WAN), a personal area network (PAN), a virtual network, and/or a combination of communication networks, such as the Internet. In one non-limiting example, network(s) 104 may comprise an enterprise network. Each of administrator computing device 102 and host computing devices $106_1$-$106_N$ may include a wired and/or wireless network interface that enables it to communicate with other computing devices connected to network(s) 104. Examples of such a network interface include but are not limited to an Ethernet interface, an IEEE 802.11 wireless LAN (WLAN) interface, a Worldwide Interoperability for Microwave Access (Wi-MAX) interface, a Universal Serial Bus (USB) interface, a cellular network interface, a Bluetooth™ interface, or a near field communication (NFC) interface. Further examples of network interfaces are described elsewhere herein.

Each accessory device $108_1$-$108_N$ comprises a peripheral device that can be connected to a corresponding host computing device and that, upon connection thereto, can provide the host computing device with access to one or more computing resources thereof. By way of example only, each accessory device $108_1$-$108_N$ may comprise a docking station ("dock") and the computing resources of each dock may comprise ports (e.g., computing resources $110_1$-$110_M$ may comprise ports). For example, in one embodiment, each accessory device $108_1$-$108_N$ comprises a Microsoft Surface® Dock that is connected to a corresponding host computing device $106_1$-$106_N$ (e.g. a Microsoft Surface® device) and computing resources $110_1$-$110_M$ comprise a combination of USB ports (e.g., USB Type A and/or USB Type C ports), a Gigabit Ethernet port, and a 3.5 mm audio output port. However, this is merely an example. Persons skilled in the relevant art(s) will appreciate that the computing resources may comprise different types of ports, including but not limited to IBM® PS/2®, serial (e.g., DB-25 or DB-9), parallel, audio (e.g., surround sound connectors or 3.5 mm TRS connector), S/PDIF, video (e.g., VGA), Digital Video Interface (DVI), VESA® DisplayPort®, RCA, Component Video, S-Video, HDMI®, RJ-45, RJ-11, or e-SATA. Furthermore, an accessory device may comprise another type of accessory device that provide access to ports, such as a hub (e.g., a USB hub), a multimedia adapter, or a port replicator.

Still further, each accessory device may comprise any one of a wide variety of other types of accessory devices that can provide host computing devices with access to other types of computing resources. For example, each accessory devices may comprise a keyboard, mouse, scanner, webcam, display, printer, external drive, or any other device that is capable of providing at least one computing resource to an attached host computing device. Such computing resources may include, but are not limited to, input resources, output resources, processor resources, storage resources, communication resources, network resources, power resources (e.g., charging power), hardware resources, software resources, firmware resources, or the like.

An accessory device may generally comprise any device that is capable of providing functionality to a host computing device to which it may be attached. In certain embodiments, an accessory device may differ from its corresponding host computing device in that the host computing device can be addressed directly by other computing devices via a network, whereas the accessory device cannot (i.e., it has no network identity independent of its host). However, this is only one example, and in other embodiments, an accessory device may have a network identity independent of its host. In certain other embodiments, an accessory device may comprise a special-purpose device that is incapable of acting as a general-purpose computer. However, this is also only an example, and in other embodiments, an accessory device may be able to function as a general-purpose computer.

For the sake of illustration, only a single accessory device is shown attached to each host computing device in FIG. 1. However, persons skilled in the relevant art(s) will appreciate that each host computing device can be attached to any number of accessory devices, and that each such accessory device can provide the host computing device with access to any number of computing resources. It will also be appreciated that the manner of connection between each type of accessory device and a corresponding host computing device may vary depending on the type of accessory device, and that any of a variety of well-known wired or wireless connectors may be used.

A manner in which the components of system 100 may operate to provision access policies to accessory devices $108_1$-$108_N$ and by which such accessory devices operate to apply those access policies will now be described in reference to an example implementation in which host computing devices $106_1$-$106_N$ comprise Microsoft Surface® devices, accessory devices $108_1$-$108_N$ comprise Microsoft Surface® Docks, and computing resources $110_1$-$110_M$ comprise ports. However, persons skilled in the relevant art(s) will appreciate that the techniques described herein can be generalized to any type of host computing device, accessory device, and computing resource. Thus, the details provided for this example implementation should not be considered limiting.

Figure 2:
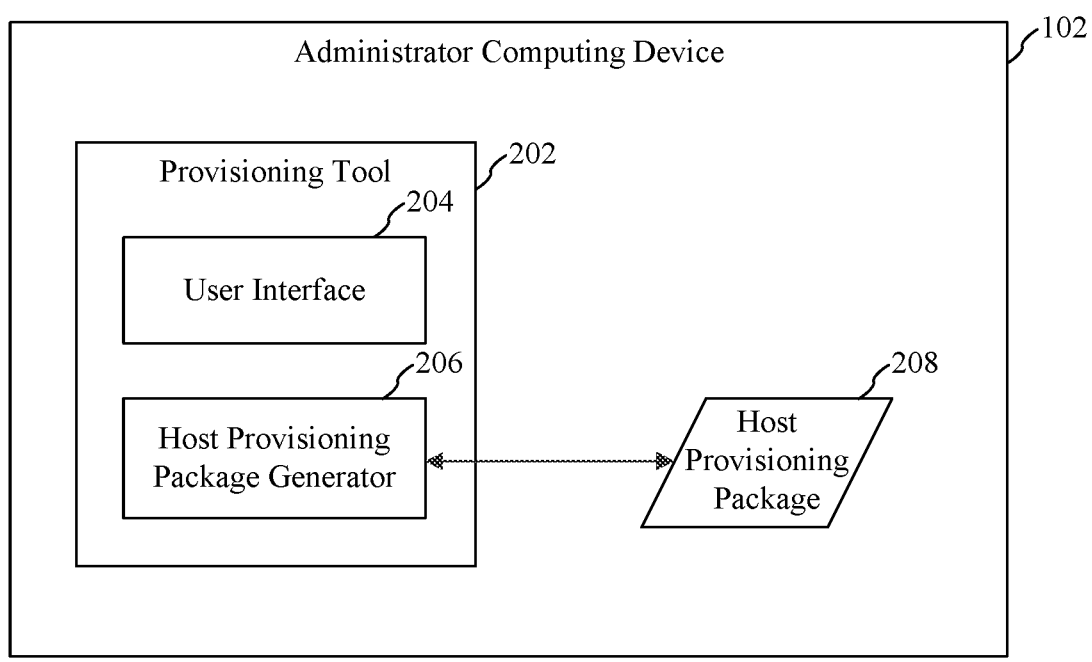
FIG. 2 is a block diagram of an administrator computing device that executes a provisioning tool for provisioning host access polices to one or more accessory devices in accordance with an embodiment.

FIG. 2 depicts a block diagram of administrator computing device 102 in accordance with one example embodiment. As shown in FIG. 2, administrator computing device 102 comprises a provisioning tool 202 that includes a user interface 204 and a host provisioning package generator 206. Provisioning tool 202 may comprise a software application that is executed by administrator computing device 102. For example, in one embodiment, provisioning tool 202 may comprise an instance of Microsoft Surface® UEFI Configurator, developed and published by Microsoft Corporation of Redmond, Wash. Alternatively, in another embodiment, provisioning tool 202 may comprise an instance of Microsoft Surface® UEFI Manager, developed and published by Microsoft Corporation of Redmond, Wash. However, these examples are not intended to be limiting.

In one embodiment, all of the components of provisioning tool 202 are executed on administrator computing device 102. In an alternate embodiment, some of the components of provisioning tool 202 (e.g., user interface 204) are executed on administrator computing device 102 while other elements (e.g., host provisioning package generator 206) are executed on a remote computing device that is connected to administrator computing device (e.g. via network(s) 104).

An IT administrator may interact with user interface 204 of provisioning tool 202 to, among other things, define host access policies and submit a certificate authority that will ultimately be provisioned to accessory devices $108_1$-$108_N$ (docks, in the present example) through interaction with corresponding host computing devices $106_1$-$106_N$. User interface 204 may comprise any type of user interface, including but not limited to a command line interface, a graphical user interface, a menu driven interface, a form based interface, a natural language interface, a touch user interface or a voice user interface. Although further reference will be made to actions performed by an IT administrator, it should be understood that users other than IT administrators may also perform such actions.

Figure 3:
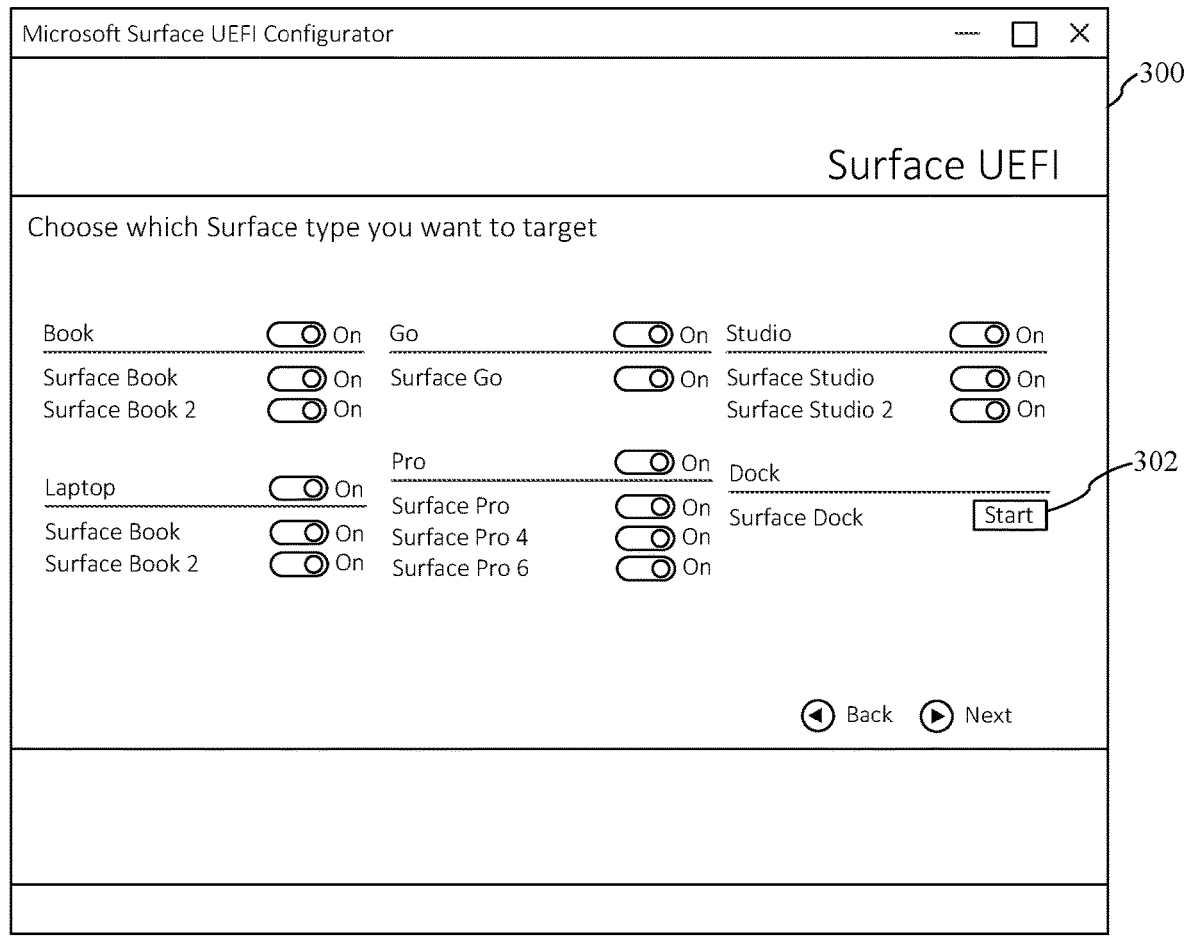
FIG. 3 depicts an example graphical user interface of a provisioning tool via which a user can initiate a process for provisioning host access policies to one or more accessory devices in accordance with an embodiment.

For example, an IT administrator may interact with user interface 204 of provisioning tool 202 to initiate a process for provisioning host access polices and a certificate authority to one or more accessory devices. By way of example, FIG. 3 depicts an example graphical user interface (GUI) 300 (which may comprise part of user interface 204) via which an IT administrator can initiate a provisioning process for one or more docks. As shown in FIG. 3, GUI 300 comprises an interactive control 302 in the form of a button labeled "Start." By interacting with interactive control 302 (e.g., by using an input device to point to and click on interactive control 302), the IT administrator may initiate the aforementioned provisioning process.

Once the provisioning process has been initiated, the IT administrator may further interact with user interface 204 to define host access policies for provisioning to each accessory device $108_1$-$108_N$. In an embodiment, the IT administrator may define two host access polices for provisioning to each accessory device $108_1$-$108_N$. These two policies may consist of an unauthenticated host access policy and an authenticated host access policy. The unauthenticated host access policy may comprise a default policy and configuration into which a dock boots or to which the dock resets on disconnect from a host computing device ("host"). In an embodiment, the default policy may deny access to the computing resources of the dock, thereby ensuring the security of those resources during its unauthenticated state and preventing any connectivity or access to those resources until a successful host authentication occurs. The authenticated host access policy may define a configuration that the dock will enter into following successful host authentication and remain in until host disconnect, or dock reset.

In an embodiment, each of these two policies contains definitions for the behavior of certain manageable dock components, each of which may be set to enabled or disabled. For example, a port or group of ports may be set to enabled or disabled. In further embodiments, not only may a port or group of ports be enabled or disabled by the host access policy, but different protocols over the same port may also be enabled or disabled. Such protocols may include, for example, and without limitation, USB 4.0 tunneling, DisplayPort Alternate Mode, USB Power Delivery (PD), and Thunderbolt Alternate Mode. Still further, settings of various chips on the dock may be enabled or disabled (e.g., 1 Gb vs. 2.5/5 Gb vs 10 GB Ethernet, bandwidth priority of USB or Ethernet switching). In sum, each manageable dock component or feature may be considered a computing resource that can be enabled or disabled in accordance with a host access policy.

The use of unauthenticated/authenticated host access policies as described above permits a number of scenarios. For example, ownership of a dock may be claimed without affecting dock behavior by provisioning a policy in which the unauthenticated host access policy is fully open, i.e. all dock components are enabled. A dock in this condition will function as it would from the factory but will be protected from further provisioning from unauthenticated hosts. In another scenario, management of individual component behavior may be defined. For example, a dock configuration may be applied to deny access to the Ethernet port only when connected to unauthenticated hosts, where authenticated hosts may have full access to all dock components. Still further, a dock may be fully locked down, such that access to all manageable components of the dock is disabled until an authenticated host is connected and authenticated, at which point functionality is restored according to the provisioned host access policy.

In accordance with one example embodiment, during manufacturing, each dock is provisioned with the unauthenticated host access policy by default with all settings (e.g., USB, Ethernet, and audio ports) set to enabled. In further accordance with such an embodiment, when a dock is provisioned in this manner, authentication is not performed by the host computing device during dock enumeration.

Figure 4:
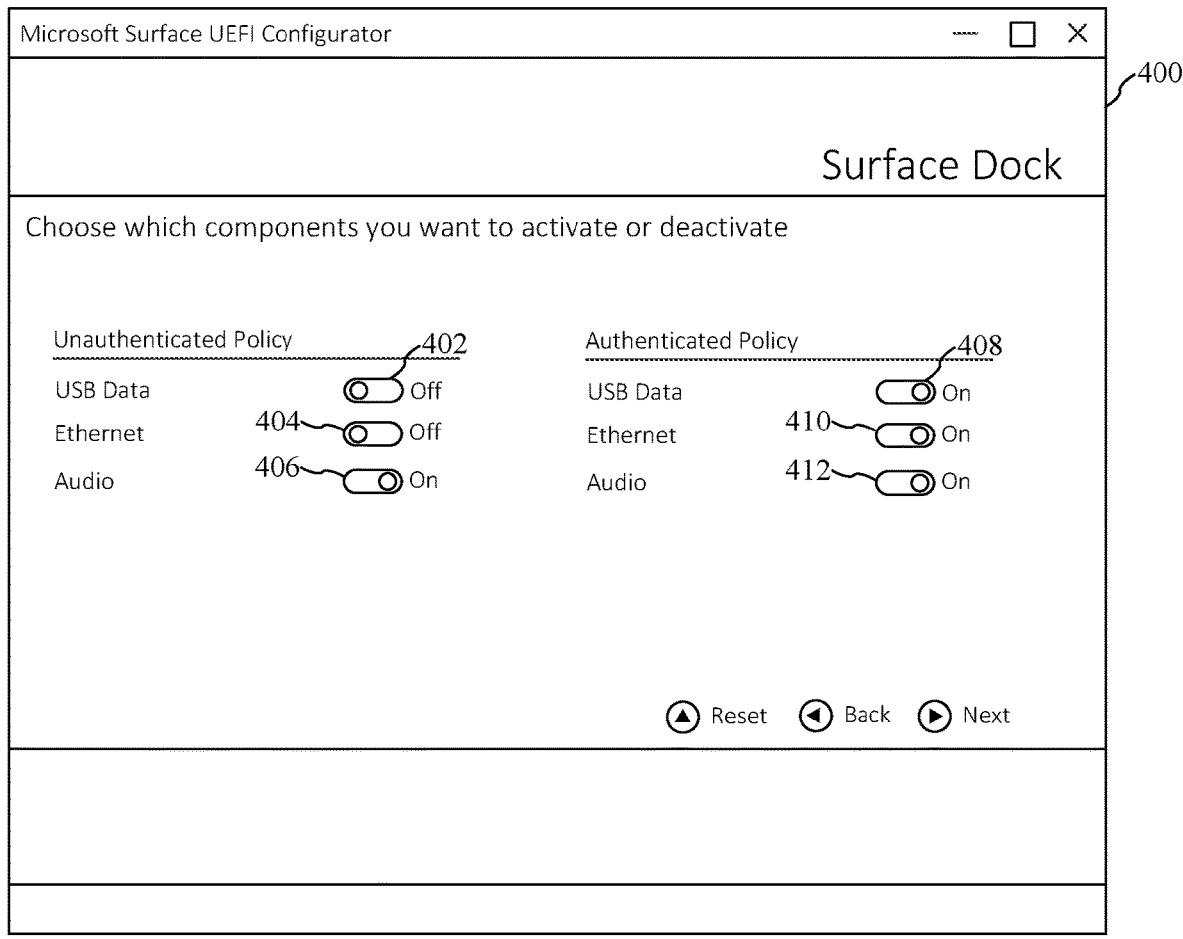
FIG. 4 depicts an example graphical user interface of a provisioning tool via which a user can define an unauthenticated host access policy and an authenticated host access policy for one or more accessory devices in accordance with an embodiment.

FIG. 4 depicts an example GUI 400 (which may comprise a portion of user interface 204) via which an IT administrator can define an unauthenticated host policy and an authenticated host policy for one or more docks. In particular, GUI 400 comprises a plurality of interactive controls each in the form of a slider switch, and each of which can be interacted with to set access to a corresponding dock resource "on" or "off" for both an unauthenticated host access policy and an authenticated host access policy. For the unauthenticated host access policy, an IT administrator may interact with interactive control 402 to turn on or off access to one or more USB ports, with interactive control 404 to turn on or off access to an Ethernet port, and with interactive control 406 to turn on or off access to an audio port. Likewise, for the authenticated host access policy, an IT administrator may interact with interactive control 408 to turn on or off access to the one or more USB ports, with interactive control 410 to turn on or off access to the Ethernet port, and with interactive control 412 to turn on or off access to the audio port. In accordance with the configuration of GUI 400 shown in FIG. 4, the unauthenticated host access policy would be USB Data "off", Ethernet "off" and Audio "on" while the authenticated host access policy would be USB Data "on", Ethernet "on" and Audio "on".

An IT administrator may further interact with user interface 204 of provisioning tool 202 to submit a dock certificate authority, a host certificate, and a provisioning administrator certificate for use in the provisioning process. The dock certificate authority that is submitted by the IT administrator will ultimately be provisioned to one or more docks and used thereby to authenticate hosts that are attached thereto. In one embodiment, the certificate authority comprises an intermediate certificate authority in a Public Key Infrastructure (PKI). The signature of the certificate authority may also serve as an identifier of host provisioning package 208 and may be used to determine whether a new policy included in the host provisioning package 208 will be applied to a dock.

The host certificate that is submitted by the IT administrator is issued from the dock certificate authority. This certificate (both private and public key) is installed into a certificate store on the host computing device and is used during host authentication on connectivity to a provisioned dock. In an embodiment, during host authentication, this certificate is used to sign a nonce, which is then sent to and validated by the dock certificate authority, after which the authenticated host access policy will be activated, and ports specified in the authenticated host access policy enabled.

The host certificate may contain a specified Enhanced Key Usage (EKU) Object Identifier (OID), which designates the certificate as a host certificate. This EKU value may uniquely identify the host certificate.

The provisioning administrator certificate that is submitted by the IT administrator may be used to sign host provisioning package 208. This signature may be checked during the provisioning process to ensure the integrity of host provisioning package 208 and prevent tampering with the contents thereof.

Figure 5:
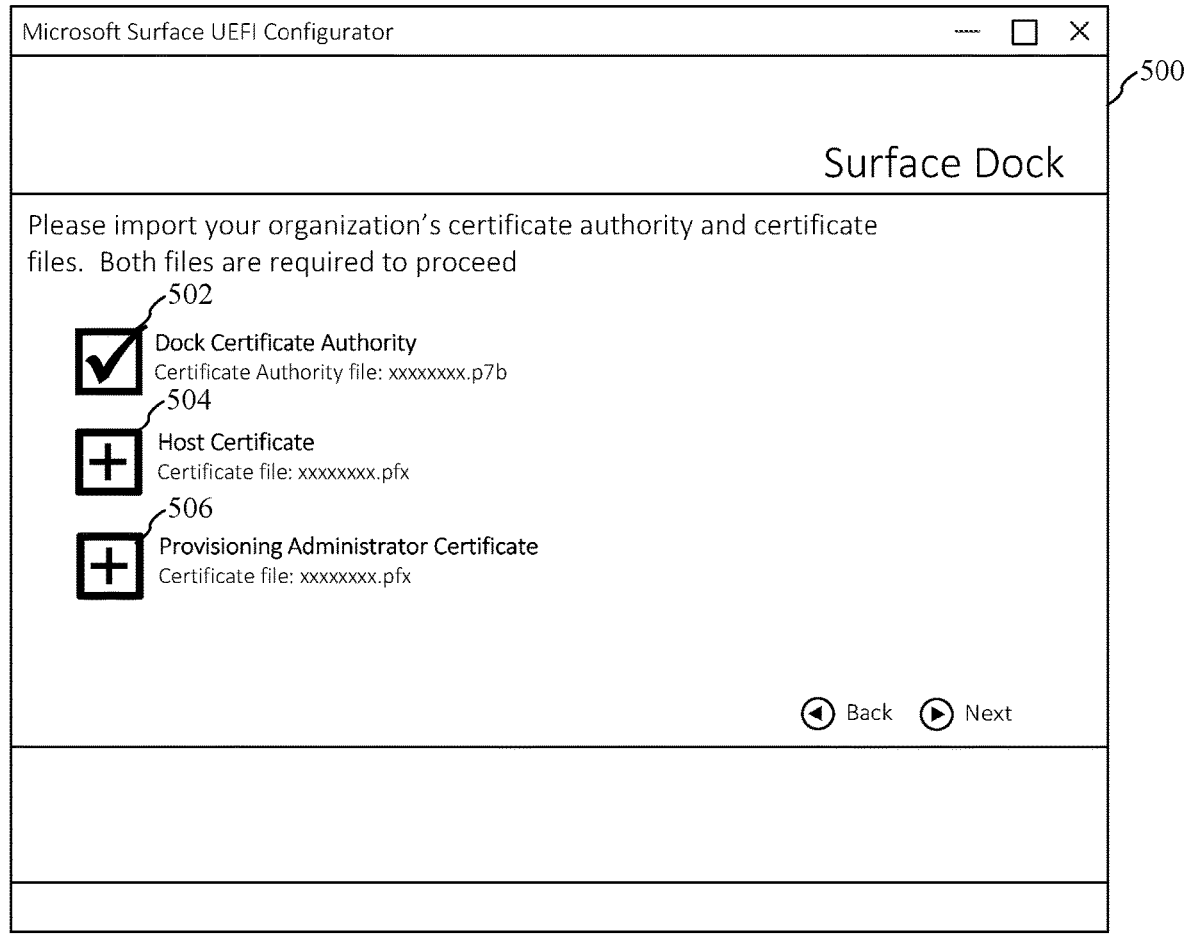
FIG. 5 depicts an example graphical user interface of a provisioning tool via which a user can submit an accessory device certificate authority, a host certificate, and a provisioning administrator certificate in accordance with an embodiment.

FIG. 5 depicts an example GUI 500 (which may comprise a portion of user interface 204) via which an IT administrator can submit the aforementioned dock certificate authority, host certificate, and provisioning administrator certificate. In particular, GUI 500 comprises a plurality of interactive controls 502, 504, 506. An IT administrator may interact with interactive control 502 to initiate a dialog by which a dock certificate authority may be submitted, with interactive control 504 to initiate a dialog by which a host certificate may be submitted, and with interactive control 506 to initiate a dialog by which a provisioning administrator certificate may be submitted.

An IT administrator may further interact with user interface 204 of provisioning tool 202 to provide a list of serial numbers of docks to be targeted for provisioning. This target serial number list may be used to ensure that host access policies are applied only to desired docks. During a provisioning sequence of a dock authentication service (to be described below), the serial number of a dock is validated against the target serial number lists of host provisioning packages installed on the host to determine if a provisioning policy should apply. In an enterprise scenario, this filter can help to protect non-target docks, such as a personal dock in a home office, from being accidentally provisioned with a corporate policy. It is noted that in alternate embodiments, identifiers other than target serial numbers may be used for provisioning, as long as each identifier is unique to a dock within the set of docks being provisioned.

Figure 6:
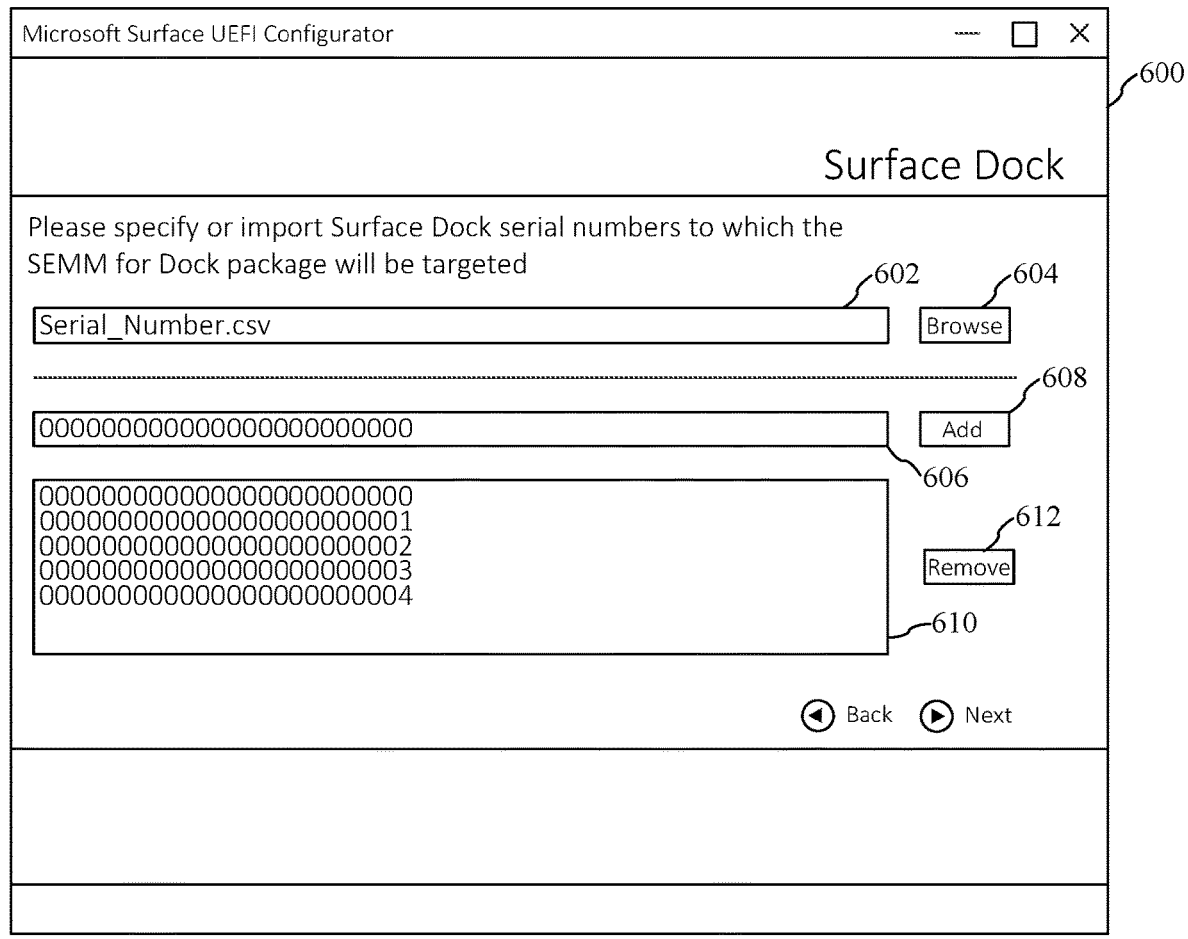
FIG. 6 depicts an example graphical user interface of a provisioning tool via which a user can provide a list of serial numbers of accessory devices to be targeted for provisioning in accordance with an embodiment.

FIG. 6 depicts an example GUI 600 (which may comprise a portion of user interface 204) via which an IT administrator can submit the aforementioned target serial number list. As shown in FIG. 6, GUI 600 comprises an interactive control 604 in the form of a button labeled "Browse." By interacting with interactive control 604 (e.g., by using an input device to point to and click on interactive control 604), an IT administrator may initiate a process by which a file system can be searched to find a file that includes a target serial number list. Upon selection of the file, the filename associated with that file is then presented in a text box 602. In the example of FIG. 6, the IT administrator has found and selected the file "Serial_Number.csv."

As further shown in FIG. 6, the IT administrator may also manually type a target serial number into a text entry box 606 and then interact with an interactive control 608 (a button labeled "Add") to cause such target serial number to be added to a list of target serial numbers displayed in a text box 610. The IT administrator may also select any of the serial numbers displayed in text box 610 (e.g., by interacting therewith) and then cause such serial numbers to be removed from the list by interacting with an interactive control 612 (a button labeled "Remove").

An IT administrator may further interact with user interface 204 of provisioning tool 202 to enable a reset setting that will trigger the removal of provisioning from a dock. In particular, when the reset setting is enabled, a dock authentication service executing on a host computing device will remove and reset provisioned policy on an attached dock if that dock is specified in the target serial number list. The reset process may include the removal of customized unauthenticated and authenticated host access policies from the dock, and the removal of the dock certificate authority from the dock. The reset process may also include resetting the unauthenticated host access policy to all available ports being enabled. In one embodiment, if an IT administrator enables the reset setting, the IT administrator need not specify host authentication policies for provisioning.

Host provisioning package generator 206 of provisioning tool 202 encapsulates various items of information associated with the provisioning process within a host provisioning package 208 which can then be deployed via network(s) 104 to host computing devices $106_1$-$106_N$. In an embodiment, host provisioning package 208 includes the host access policies and the dock certificate authority within a provisioning payload. This payload is enumerated and written to a dock when provisioning is performed. In addition to the provisioning payload, host provisioning package 208 also contains: the package signature, a package version number, the host certificate, the provisioning administrator certificate, the target serial number list, and the reset setting.

The package signature is a non-colliding string that serves to avoid collision between multiple host provisioning packages installed on the same host computing device. A host computing device may be configured with multiple packages where access to multiple docks with different policies is desired.

The package version number reflects the version of the package and will be stored on the dock following successful provisioning thereof. Storage of the version number on the dock enables dock policies to be updated without conflict between host provisioning packages with identical signatures. In an embodiment, the package version number is a strictly increasing numeric value. A new host provisioning package with a package version number greater than the package version number stored in the dock is accepted for provisioning, whereas a new host provisioning package with a package version number less than or equal to the package version number stored in the dock will not be accepted for provisioning.

Host provisioning package 208 is deployed to each of host computing devices $106_1$-$106_N$ via network(s) 104 for installation thereon. Host provisioning package 208 may be installed on each of host computing devices $106_1$-$106_N$ by an installer executing thereon (for example and without limitation, an MSI installer) or by a software package management tool executing thereon (for example, and without limitation, Microsoft® System Center Configuration Manager (SCCM)). However, these examples are not intended to be limiting and other methods of installation may be used.

Figure 7:
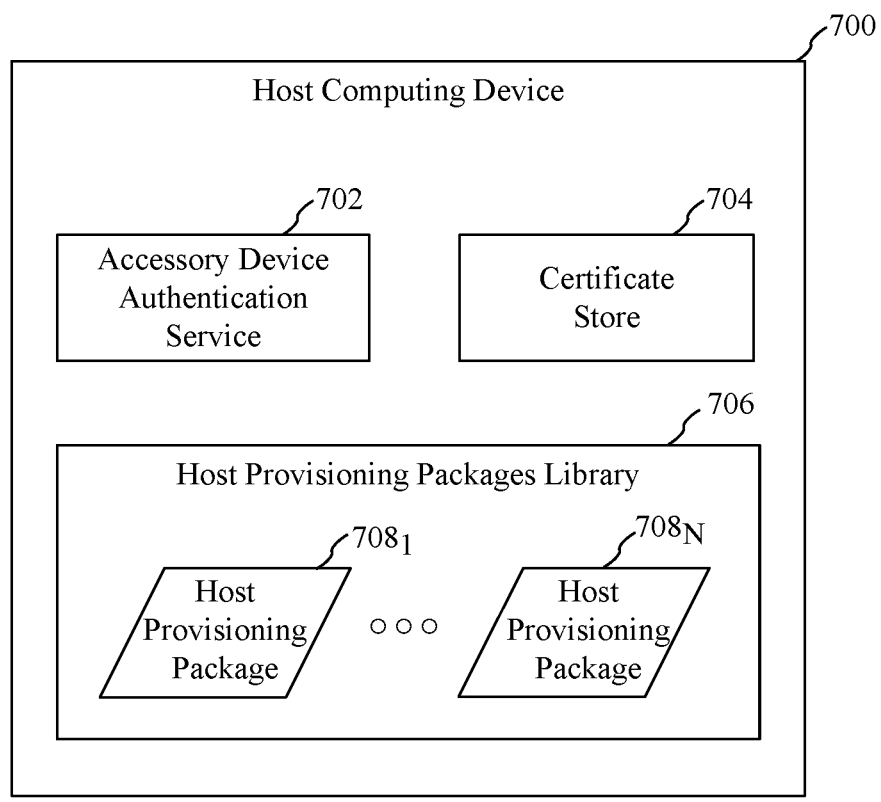
FIG. 7 is a block diagram of a host computing device that can provision host access policies to an attached accessory device and that can be authenticated thereby in accordance with an embodiment.

FIG. 7 is a block diagram of a host computing device 700, which is an example implementation of any one of host computing devices $106_1$-$106_N$ of FIG. 1. As shown in FIG. 7, host computing device 700 stores each host provisioning package that has been installed thereon in a host provisioning packages library 706. Thus, for example, host provisioning package 208 that was generated by provisioning tool 202 in accordance with the foregoing description may be deployed to and installed on host computing device 700 and stored thereby in host provisioning packages library 706. The host provisioning packages that are stored in host provisioning packages library 706 are represented in FIG. 7 as host provisioning packages $708_1$-$708_N$.

As further shown in FIG. 7, host computing device 700 further comprises a certificate store 704. Certificate store 704 is used at least in part to store host certificates and provisioning administrator certificates that are provided as part of host provisioning packages $708_1$-$708_N$.

As further shown in FIG. 7, host computing device 700 comprises an accessory device authentication service 702 installed thereon. Accessory device authentication service 702 may be installed on host computing device 700 using any suitable software installation method. In accordance with one non-limiting example, accessory device authentication service 702 is bundled with a host provisioning package that is deployed to host computing device 700 and is installed thereon along with the host provisioning package (e.g., by an installer or software package management tool).

Accessory device authentication service 702 manages a process for identifying and provisioning targeted accessory devices that are attached to host computing device 700 with host authentication policies, as well as authenticating configured host computing devices for authentication to a provisioned accessory device. In one embodiment, the execution of accessory device authentication service 702 is triggered upon connection of an accessory device to host computing device 700.

Figure 8A:
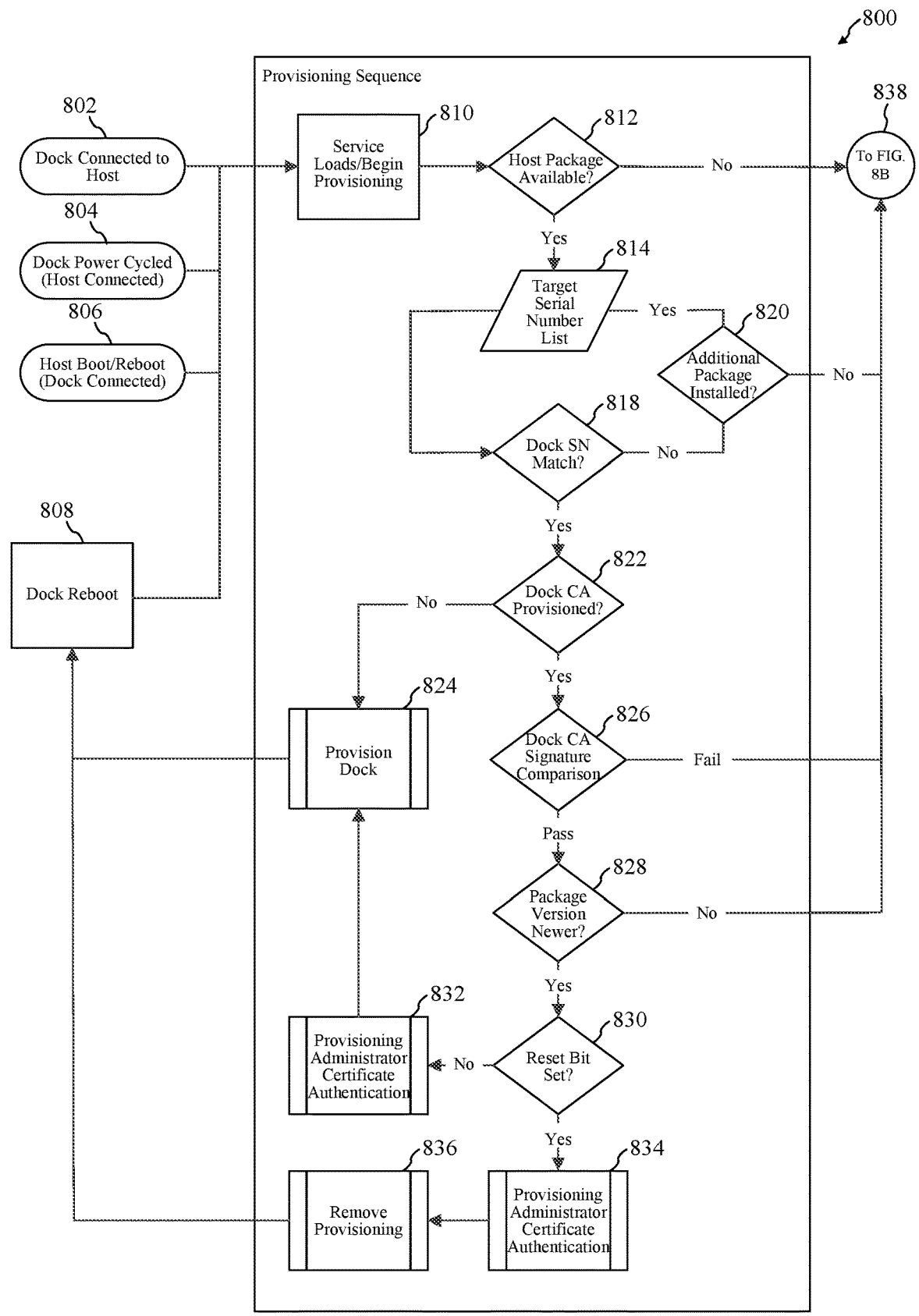
FIG. 8A depicts a flowchart of a provisioning sequence that may be performed by the host computing device of FIG. 7 in accordance with an embodiment.
Figure 8B:
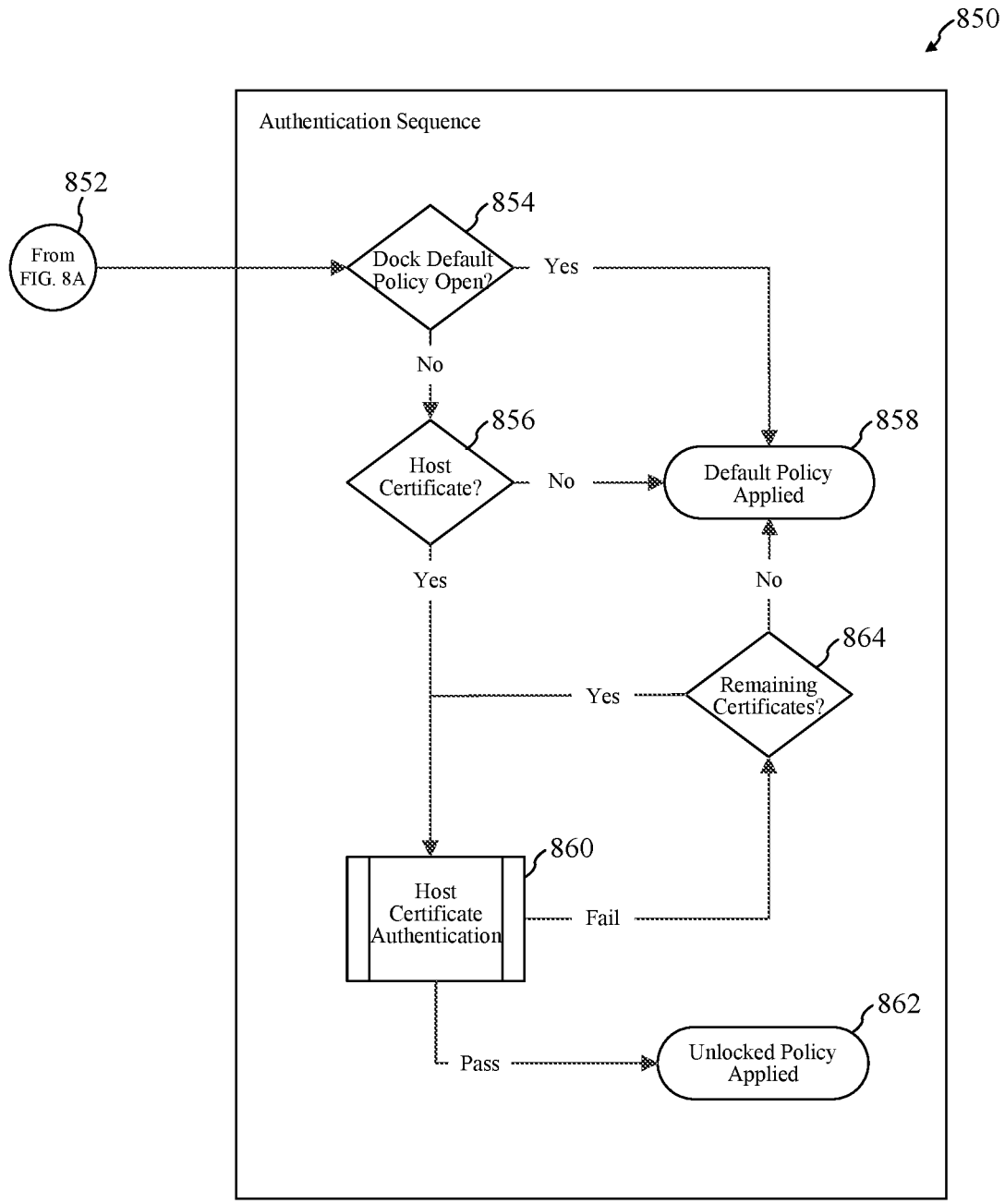
FIG. 8B depicts a flowchart of an authentication sequence that may be performed by the host computing device of FIG. 7 in accordance with an embodiment.

An example manner of operation of accessory device authentication service 702 will now be described in reference to FIGS. 8A and 8B. In accordance with this example, the operations of accessory device authentication service 702 include a provisioning sequence 800, which is depicted in FIG. 8A, and an authentication sequence 850, which is depicted in FIG. 8B. In accordance with this example, the accessory device that is connected to host computing device 700 comprises a Microsoft Surface® Dock but, as noted above, the techniques described herein may be applied to any type of accessory device that can provide computing resources to an attached host computing device.

As shown in FIG. 8A, accessory device authentication service 702 is loaded into volatile memory of host computing device 700 and is executed therefrom, thus beginning the provisioning sequence (810). This step is performed in response to one of of a number of events, wherein these events include connection of a dock to host computing device 700 (802), power cycling of a dock that is connected to host computing device 700 (804), booting or rebooting of host computing device 700 while connected to a dock (806), or rebooting a dock that is connected to host computing device 700 after provisioning thereof (808).

After the provisioning sequence is initiated, accessory device authentication service 702 determines whether any host provisioning packages are available on host computing device 700 (812). For example, accessory device authentication service 702 may make this determination by searching host provisioning package library 704 to determine if any host provisioning packages are stored therein. If accessory device authentication service 702 determines that there are no host provisioning packages available on host computing device 700, then the provisioning sequence is terminated and control flows to authentication sequence 850 (838).

However, if accessory device authentication service 702 determines that there is a host provisioning package available on host computing device 700, then accessory device authentication service 702 retrieves a target serial number list (814) from the host provisioning package and compares the serial number of the attached dock to each serial number in the list to see if there is a match (818). In one embodiment, accessory device authentication service 702 obtains the serial number of the attached dock using Microsoft® Windows Management Instrumentation (WMI), although this is only an example and other methods of obtaining the serial number of the attached dock may be used.

If accessory device authentication service 702 finds a match between the serial number of the attached dock and a serial number in the target serial number list, then the relevant host provisioning package will be further processed by provisioning sequence 800 in a manner to be discussed below. However, if accessory device authentication service 702 does not find a match between the serial number of the attached dock and any serial number in the target serial number list, then accessory device authentication service 702 determines if there is an additional host provisioning package installed on host computing device 700 (820). If accessory device authentication service 702 determines that there are no more host provisioning packages installed on host computing device 700, then the provisioning sequence is terminated and control flows to authentication sequence 850 (838).

However, if accessory device authentication service 702 determines that there is another host provisioning package installed on host computing device 700, then accessory device authentication service 702 will again retrieve target serial number list (814) for the host provisioning package and determine through matching (818) if such host provisioning package should be applied to the attached dock such that further processing of the host provisioning package is required. It can be seen from the structure of provisioning sequence 800 of FIG. 8A that accessory device authentication service 702 will repeat these steps (814 and 818) for each host provisioning package that is installed on host computing device 700 until there are none left for which to perform the steps. In one embodiment, accessory device authentication service 702 accesses the host provisioning packages to perform the serial number comparisons in an alphabetical order of provisioning package signature, although other ordering techniques may be used.

As shown in FIG. 8A, if there is a match between the serial number of the attached dock and a serial number from the target serial number list of a host provisioning package, then accessory device authentication service 702 queries the attached dock to determine if a certificate authority has already been provisioned thereto (822). For example, accessory device authentication service 702 may query the attached dock by placing an application programming interface (API) call to the attached dock that requests that the attached dock return its provisioned certificate authority. If the response to this API call does not include a certificate authority, then accessory device authentication service 702 can determine that no certificate authority has been provisioned to the dock. However, if the response to the API call does include a certificate authority, then accessory device authentication service 702 can determine that the attached dock already has a certificate authority provisioned thereto.

If accessory device authentication service 702 determines that no certificate authority has been provisioned to the attached dock, then accessory device authentication service 702 will provision the attached dock with the host authentication policies and the certificate authority included in the provisioning payload of the relevant host provisioning package (824). During this step, accessory device authentication service 702 will also write the version number of the host provisioning package to the dock. After this step, the attached dock will be rebooted (808) and the provisioning sequence thus reloaded and reinitiated (810).

However, if accessory device authentication service 702 determines that the attached dock has already been provisioned with a certificate authority, then accessory device authentication service 702 will compare the digital signature of the certificate authority included in the provisioning payload of the relevant host provisioning package with the digital signature of the certificate authority obtained from the attached dock (826). If accessory device authentication service 702 determines that the signatures do not match, then the provisioning sequence is terminated and control flows to authentication sequence 850 (838).

However, if accessory device authentication service 702 determines that the signatures do match, then accessory device authentication service 702 reads a package version number stored on the attached dock and determines whether the package version number included in the relevant host provisioning package is less than or equal to the package version number obtained from the attached dock (828). If accessory device authentication service 702 determines that the package version number included in the relevant host provisioning package is less than or equal to the version number obtained from the attached dock, then the provisioning sequence is terminated and control flows to authentication sequence 850 (838).

However, if accessory device authentication service 702 determines that the package version number included in the relevant host provisioning package is greater than the version number obtained from the attached dock, then provisioning continues and accessory device authentication service 702 determines if the reset bit in the relevant host provisioning package is enabled (830).

If accessory device authentication service 702 determines that the reset bit in the relevant host provisioning package is not enabled, then accessory device authentication service 702 will perform a provisioning administrator certificate authentication process (832) with the attached dock, the details of which will be provided below. If the provisioning administrator certificate authentication process (832) is successful, then accessory device authentication service 702 will provision the attached dock with the host authentication policies and the certificate authority included in the provisioning payload of the relevant host provisioning package (824) as well as write the package version number of the host provisioning package to the dock. If any host authentication polices, certificate authority or package version number were previously stored on the attached dock, they will be overwritten during this provisioning step. After this step, the attached dock will be rebooted (808) and the provisioning sequence thus reloaded and reinitiated (810).

However, if during step 830 accessory device authentication service 702 determines that the reset bit in the relevant host provisioning package is enabled, then accessory device authentication service 702 will perform a provisioning administrator certificate authentication process (834) with the attached dock, the details of which will be provided below. If the provisioning administrator certificate authentication process (834) is successful, then accessory device authentication service 702 will cause the host access policies, certificate authority, and package version number stored on the attached dock to be removed therefrom (836), and the factory behavior of the attached dock to be restored. Accordingly, the unauthenticated host policy is reconfigured on the attached dock with all ports enabled. After this step, the attached dock will be rebooted (808) and the provisioning sequence thus reloaded and reinitiated (810).

In an embodiment, multiple host provisioning packages may be stored on host computing device 702 that apply to the same attached dock (i.e., multiple host provisioning packages may target the same dock serial number). In accordance with one such embodiment, an unprovisioned dock will be provisioned with the host access policies specified by the first host provisioning package installed to host computing device 702 as determined by alphanumeric order of package signatures. In further accordance with such an embodiment, a provisioned dock will only be provisioned with host authentication policies when such first host provisioning package also contains the same dock certificate authority as was provisioned previously on the dock.

As shown in FIG. 8B, after the termination of the provisioning sequence (852), accessory device authentication service 702 will perform authentication sequence 850 so that the attached dock may determine which host access policy to apply with respect to host computing device 700. It is noted that if accessory device authentication service 702 has just freshly provisioned the attached dock, then accessory device authentication service 702 will execute provisioning sequence 800 a second time until the host provisioning package version number is compared and found to be equal to the package version number stored on the dock or provisioning sequence 800 fails, after which authentication sequence 850 will be run.

As shown in FIG. 8B, authentication sequence 850 begins with accessory device authentication service 702 determining if the default policy (i.e., the unauthenticated host access policy) stored on the attached dock is fully open—i.e., if such policy provides access to all dock ports (854). In an embodiment, accessory device authentication service 702 performs this step by retrieving the default policy from the attached dock (e.g., via an API call) and examining it. If accessory device authentication service 702 determines that the default policy stored on the dock is fully open, then it terminates authentication sequence 850 and the attached dock therefore applies the default policy (858).

However, if accessory device authentication service 702 determines that the default policy stored on the attached dock is not fully open, then accessory device authentication service 702 determines if a host certificate is stored in certificate store 704 (856). As previously noted, a host certificate included in a host provisioning package will be installed to certificate store 704 as part of the installation of that package on host computing device 700. If accessory device authentication service 702 determines that no host certificate is available in certificate store 704, then it stops the authentication sequence 850 and the attached dock therefore applies the default policy (858).

However, if accessory device authentication service 702 determines that a host certificate is available in certificate store 704, then it uses that host certificate to perform a host certificate authentication process (860) with the attached dock, the details of which will be provided below. If the host certificate authentication process (860) is successful, then the unlocked policy (i.e., the authenticated host access policy) will be applied by the attached dock (862) and authentication sequence 850 is terminated.

However, if the host certificate authentication process (860) fails, then accessory device authentication service 702 determines if there is another host certificate remaining in certificate store 704 (864). If accessory device authentication service 702 determines that there is another host certificate remaining in certificate store 704, then it will use that host certificate to again perform the host certificate authentication process (860) with the attached dock and it will thus continue to cycle through all the host certificates in certificate store 704 until either the host certificate authentication process (860) is passed and the unlocked policy is applied by the attached dock (862) or there are no host certificates left in certificate store 704, in which case the attached dock applies the default policy (858) and the authentication sequence 850 is terminated.

Figure 9:
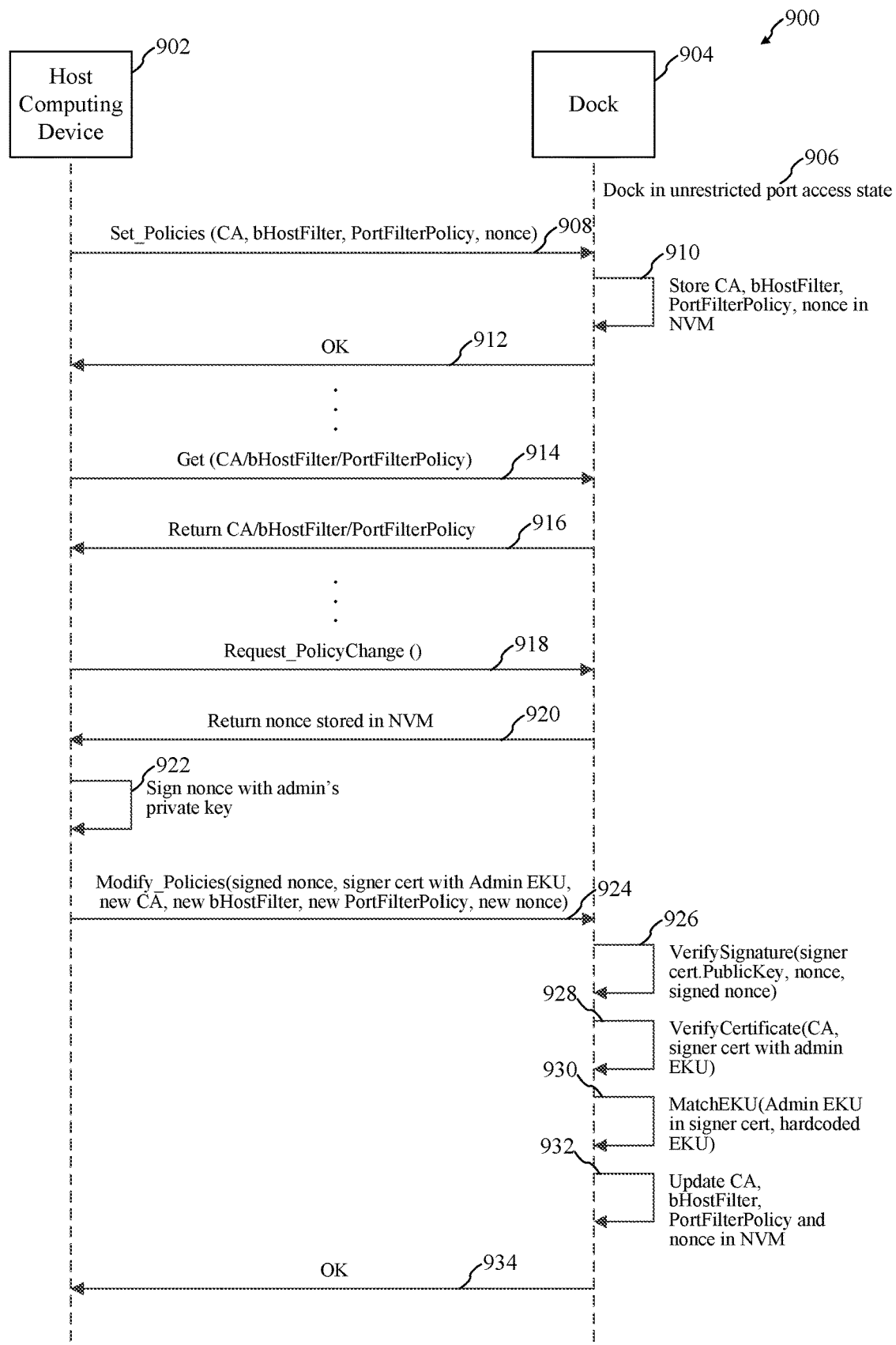
FIG. 9 depicts a sequence diagram that illustrates various interactions and operations that may occur during provisioning of an accessory device by a host computing device in accordance with an embodiment.

FIG. 9 depicts a sequence diagram 900 that illustrates various interactions and operations that may occur during provisioning of a dock 904 by a host computing device 902 in accordance with an example embodiment.

As shown in FIG. 9, dock 904 begins in an unrestricted port access state with no certificate authority currently provisioned thereto (906). In this state, dock 904 applies an unauthenticated host access policy with all ports open. Host 902 then issues a Set_Policies API call to dock 904 (908), the parameters of which include the certificate authority to be provisioned to the dock (CA), a binary indicator of whether host authentication should be performed by the dock (bHostFilter), the unauthenticated and authenticated host access policies to be provisioned to the dock (PortFilterPolicy), and a cryptographic nonce.

In response to receiving the Set_Policies API call (908) (and since dock 904 is in the unrestricted port access state with no provisioned certificate authority), dock 904 will accept and store in non-volatile memory thereof the certificate authority (CA), the binary indicator of whether host authentication should be performed (bHostFilter), the unauthenticated and authenticated host access policies (PortFilterPolicy), and the nonce (910). Dock 904 will then return a confirmation message to host computing device 902 to indicate that the Set_Policies API call was successful (912).

The foregoing interactions and operations (908, 910, 912) may occur, for example, as part of the provision dock process (824) of provisioning sequence 800 as discussed above in reference to FIG. 8A, when dock 904 originally has no certificate authority provisioned thereto.

Host computing device 902 may also issue a Get API call to dock 904 (914), the parameters of which may include one or more of the dock certificate authority (CA), the dock binary indicator of whether host authentication should be performed (bHostFilter), and the dock unauthenticated and authenticated host access polices (PortFilterPolicy). In response to receiving the Get API call (914), dock 904 will return the information specified by the Get API call (916). In other words, dock 904 will return one or more of the dock certificate authority (CA), the dock binary indicator of whether host authentication should be performed (bHostFilter), and the dock unauthenticated and authenticated host access polices (PortFilterPolicy).

The foregoing interactions and operations (914, 916) may be performed, for example, in step 822 of provisioning sequence 800 in which host computing device 902 determines if dock 904 has a certificate authority provisioned thereto.

Host computing device 902 may also issue a Request_PolicyChange API call to dock 904 (918), which may have no parameters associated therewith. In response to receiving the Request_PolicyChange API call, dock 904 returns the nonce stored in its non-volatile memory to host computing device 902 (920). In response to receiving the nonce, host computing device 902 signs the nonce with its provisioning administrator private key (received as part of a host provisioning package as discussed above) (922) and then sends a Modify_Policies API call to dock 904 (924), the parameters of which include the signed nonce, the provisioning administrator certificate (which includes the provisioning administrator public key and an administrator EKU value), a new certificate authority to be provisioned to the dock (new CA), a new binary indicator of whether host authentication should be performed by the dock (new bHostFilter), new unauthenticated and authenticated host access policies to be provisioned to the dock (new PortFilterPolicy), and a new nonce.

In an alternate embodiment, host computing device 902 signs both the old nonce and the new nonce with its provisioning administrator private key and provides only signed versions of both nonces as parameters of the Modify_Policies API call. This can help to prevent a scenario in which the Modify_Policies API call is intercepted and the new nonce replaced by the old nonce, which could allow replay of an old Modify_Policies API call that uses the old nonce. By signing the new nonce in this manner, host computing device 902 can protect it from modification during a Modify_Policies API call.

In response to receiving the Modified Policies API call from host computing device 902 (924), dock 904 performs a number of operations. As shown in FIG. 9, dock 904 uses the public key from the provisioning administrator certificate to verify the digitally-signed nonce (926). This may entail invoking a VerifySignature function whose parameters include the public key from the provisioning administrator certificate, the nonce, and the digitally-signed nonce. The Verify Signature function may utilize the public key from the provisioning administrator certificate to decrypt the digitally-signed nonce and then compare the result to the raw nonce and, if the two values match, the digitally-signed nonce is verified and the VerifySignature function succeeds. If the VerifySignature function fails, then the Modify_Policies API call will also fail.

In response to receiving the Modified Policies API call from host computing device 902 (924), dock 904 will also use the public key of the dock certificate authority to verify the provisioning administrator certificate. This may entail invoking a VerifyCertificate function whose parameters include the dock certificate authority and the provisioning administrator certificate. The VerifyCertificate function may utilize the public key of the dock certificate authority to decrypt a digital signature included in the provisioning administrator certificate and then compare the result to a hash of other contents of the provisioning administrator certificate. If the two values match, then the provisioning administrator certificate is verified and the VerifyCertificate function succeeds. If the VerifyCertificate function fails, then the Modify_Policies API call will also fail.

In response to receiving the Modified Policies API call from host computing device 902 (924), dock 904 will also verify an administrator EKU value included in the provisioning administrator certificate (930). This may entail invoking a MatchEKU function whose parameters include the administrator EKU value from the provisioning administrator certificate and an EKU value that is stored in non-volatile memory by the dock (e.g., as part of a firmware image that is stored by the dock). The MatchEKU function may compare the administrator EKU value from the provisioning administrator certificate to the EKU value that is stored in non-volatile memory by the dock and if the two values match, then the administrator EKU value included in the provisioning administrator certificate is verified and the MatchEKU function succeeds. If the MatchEKU function fails, then the Modify_Policies API call will also fail.

As noted above, if any of the VerifySignature (926), VerifyCertificate (928) or MatchEKU (930) functions fails, then the Modify_Policies API call will fail. However, if all of the Verify Signature (926), VerifyCertificate (928) and MatchEKU (930) functions succeed, then dock 904 will overwrite the dock certificate authority (CA), the dock binary indicator of whether host authentication should be performed (bHostFilter), and the dock unauthenticated and authenticated host access polices (PortFilterPolicy) with their corresponding new values (new CA, new bHostFilter and new PortFilterPolcy) and also replace the old nonce with the new nonce in non-volatile memory (932). Dock 904 will then return a confirmation message to host computing device 902 to indicate that the Modify_Policies API call was successful (934).

The foregoing interactions and operations (918, 920, 922, 924, 926, 928, 930, 932, 934) may occur, for example, as part of steps 832 and 824 of provisioning sequence 800 as discussed above in reference to FIG. 8A, in which a successful performance of provisioning administrator certificate authentication (832) enables the dock to be provisioned with a new certificate authority and new host access policies (824).

Figure 10:
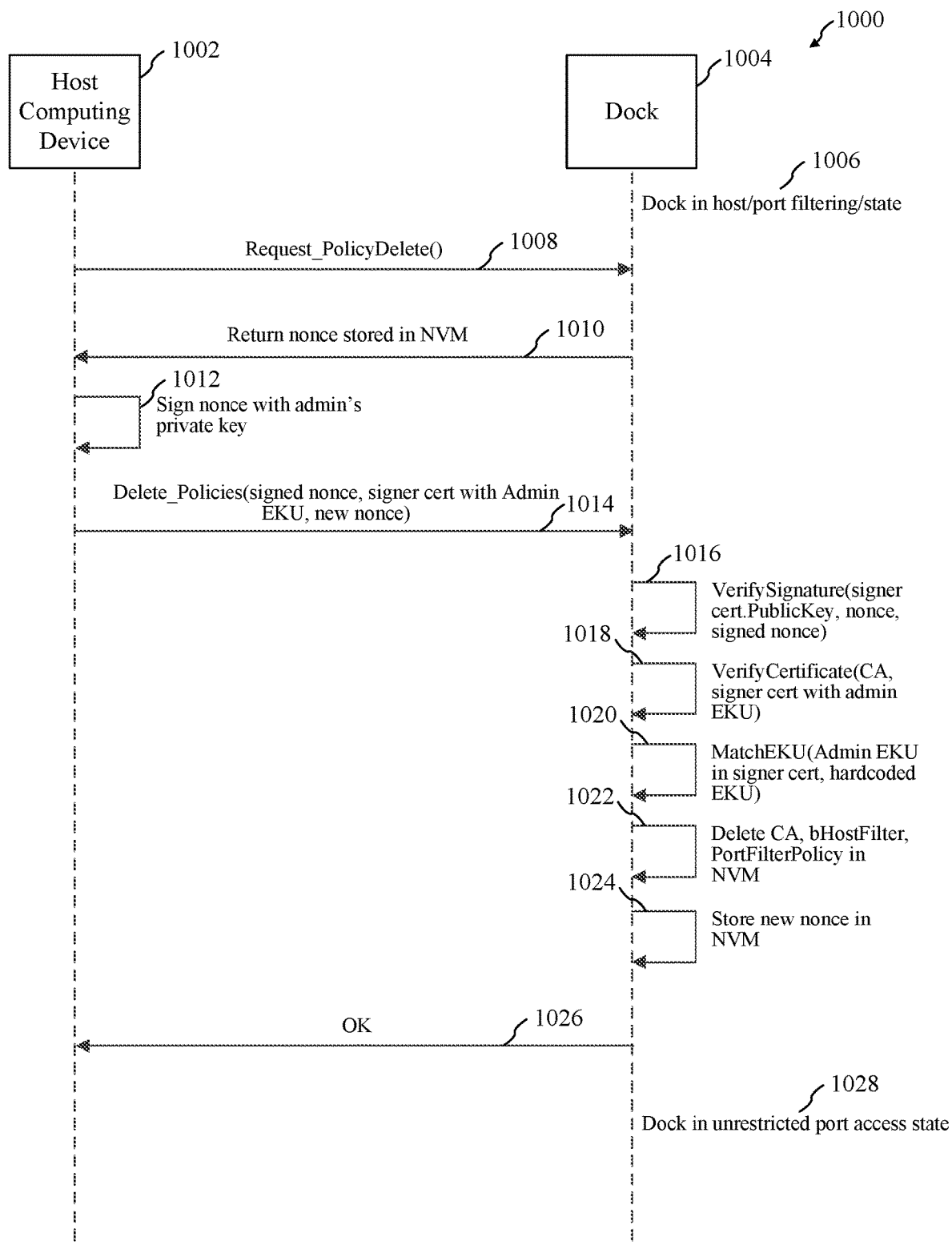
FIG. 10 depicts a sequence diagram that illustrates various interactions and operations that may occur when a host computing device attempts to delete host access policies from an accessory device in accordance with an example embodiment.

FIG. 10 depicts a sequence diagram 1000 that illustrates various interactions and operations that may occur when a host computing device 1002 attempts to delete host access policies from a dock 1004 in accordance with an example embodiment.

As shown in FIG. 10, sequence diagram 1000 begins with dock 1004 in a host/port filtering state (1006). In this state, dock 1004 is provisioned with a certificate authority and host access policies. At this point, host computing device 1002 may issue a Request_PolicyDelete API call to dock 1004 (1008), which may have no parameters associated therewith. In response to receiving the Request_PolicyDelete API call, dock 1004 returns the nonce stored in its non-volatile memory to host computing device 1002 (1010). In response to receiving the nonce, host computing device 1002 signs the nonce with its provisioning administrator private key (received as part of a host provisioning package as discussed above) (1012) and then sends a Delete_Policies API call to dock 1004 (1014), the parameters of which include the signed nonce, the provisioning administrator certificate (which includes the provisioning administrator public key and an administrator EKU value), and a new nonce.

In an alternate embodiment, host computing device 1002 signs both the old nonce and the new nonce with its provisioning administrator private key and provides only signed versions of both nonces as parameters of the Delete_Policies API call. This can help to prevent a scenario in which the Delete_Policies API call is intercepted and the new nonce replaced by the old nonce, which could allow replay of an old Delete_Policies API call that uses the old nonce. By signing the new nonce in this manner, host computing device 902 can protect it from modification during a Delete_Policies API call.

In response to receiving the Delete_Policies API call from host computing device 1002 (1014), dock 1004 performs a number of operations. As shown in FIG. 10, dock 1004 uses the public key from the provisioning administrator certificate to verify the digitally-signed nonce (1016). This may entail invoking a VerifySignature function whose parameters include the public key from the provisioning administrator certificate, the nonce, and the digitally-signed nonce. The Verify Signature function may utilize the public key from the provisioning administrator certificate to decrypt the digitally-signed nonce and then compare the result to the raw nonce and if the two values match, then the digitally-signed nonce is verified and the VerifySignature function succeeds. If the VerifySignature function fails, then the Delete_Policies API call will also fail.

In response to receiving the Delete_Policies API call from host computing device 1002 (1014), dock 1004 will also use the public key of the dock certificate authority to verify the provisioning administrator certificate (1018). This may entail invoking a VerifyCertificate function whose parameters include the dock certificate authority and the provisioning administrator certificate. The VerifyCertificate function may utilize the public key of the dock certificate authority to decrypt a digital signature included in the provisioning administrator certificate and then compare the result to a hash of other contents of the provisioning administrator certificate. If the two values match, then the provisioning administrator certificate is verified and the VerifyCertificate function succeeds. If the VerifyCertificate function fails, then the Delete_Policies API call will also fail.

In response to receiving the Delete_Policies API call from host computing device 1002 (1024), dock 1004 will also verify the administrator EKU value included in the provisioning administrator certificate (1020). This may entail invoking a MatchEKU function whose parameters include the administrator EKU value from the provisioning administrator certificate and an EKU value that is stored in non-volatile memory by the dock (e.g., as part of a firmware image that is stored by the dock). The MatchEKU function may compare the administrator EKU value from the provisioning administrator certificate to the EKU value that is stored in non-volatile memory by the dock and if the two values match, then the administrator EKU value included in the provisioning administrator certificate is verified and the MatchEKU function succeeds. If the MatchEKU function fails, then the Delete_Policies API call will also fail.

The leveraging of the EKU attribute of the provisioning administrator certificate to carry the administrator EKU value as discussed above with respect to both FIGS. 9 and 10 advantageously enables additional authentication of the host computing device without increasing the amount of communication between the host computing device and the dock, since providing such information outside of the provisioning administrator certificate would require a separate communication mechanism. Accordingly, leveraging the EKU attribute in this way conserves communication bandwidth between the two devices and reduces power consumption by each device.

As noted above, if any of the VerifySignature (1016), VerifyCertificate (1018) or MatchEKU (1020) functions fails, then the Delete_Policies API call will fail. However, if all of the VerifySignature (1016), VerifyCertificate (1018) and MatchEKU (1020) functions succeed, then dock 1004 will delete the dock certificate authority (CA), the dock binary indicator of whether host authentication should be performed (bHostFilter), and the dock unauthenticated and authenticated host access polices (PortFilterPolicy) from non-volatile memory (1022) and will store the new nonce in non-volatile memory (1024). Dock 1004 will then return a confirmation message to host computing device 1002 to indicate that the Delete_Policies API call was successful (1026), after which dock 1004 will operate in its unrestricted port access state with no certificate authority currently provisioned thereto (1028). In this state, dock 1004 applies an unauthenticated host access policy with all ports open.

The foregoing interactions and operations (1008, 1010, 1012, 1014, 1016, 1018, 1020, 1022, 1024, 1026, 1028) may occur, for example, as part of steps 834 and 836 of provisioning sequence 800 as discussed above in reference to FIG. 8A, in which a successful performance of provisioning administrator certificate authentication (834) enables a provisioned certificate authority and provisioned host access policies to be removed from the dock (824), e.g., as part of a dock reset operation.

FIGS. 9 and 10, as described above, illustrate techniques by which a dock may authenticate a host computing device before allowing the host computing device to modify or remove a host access policy or a certificate authority that was previously provisioned to the dock. It is to be appreciated that in certain alternative embodiments, the same or similar authentication techniques may be used to authenticate a host computing device prior to allowing the host computing device to provision an initial set of host access policies on a dock, provided that a certificate authority has already been provisioned to the dock.

In still further embodiments, in addition to the host authentication requirements described above, a host computing device may also be required to provide a dock with an identifier of the dock that matches an identifier stored by the dock itself before the host computing device will be allowed to set, modify or remove host access policies or a certificate authority on the dock. In one embodiment, the identifier comprises a randomized identifier. In another embodiment, the identifier comprises a hash-based message authentication code (HMAC) obtained from the dock serial number and a secret manufacturer key. Still other types of dock identifiers may be used. The identifier may be stored in non-volatile memory on the dock (e.g., as part of the dock firmware) but may not be programmatically queryable by any external device. In accordance with such an embodiment, an additional layer of security is provided since an administrator must acquire the dock identifier from a physical exterior of the dock, dock packaging, a supply chain (e.g., an inventory system of a distributor from which the dock is purchased), or the like. This additional layer of security can help defeat remote attacks on the dock (e.g., remote denial of service attacks on the dock), since a remote user cannot programmatically query the dock for its identifier and then use it to provision the dock.

In further accordance with such an embodiment, the dock identifier described immediately above may be substituted for the target serial number of the dock in the provisioning sequence of FIG. 8A.

Figure 11:
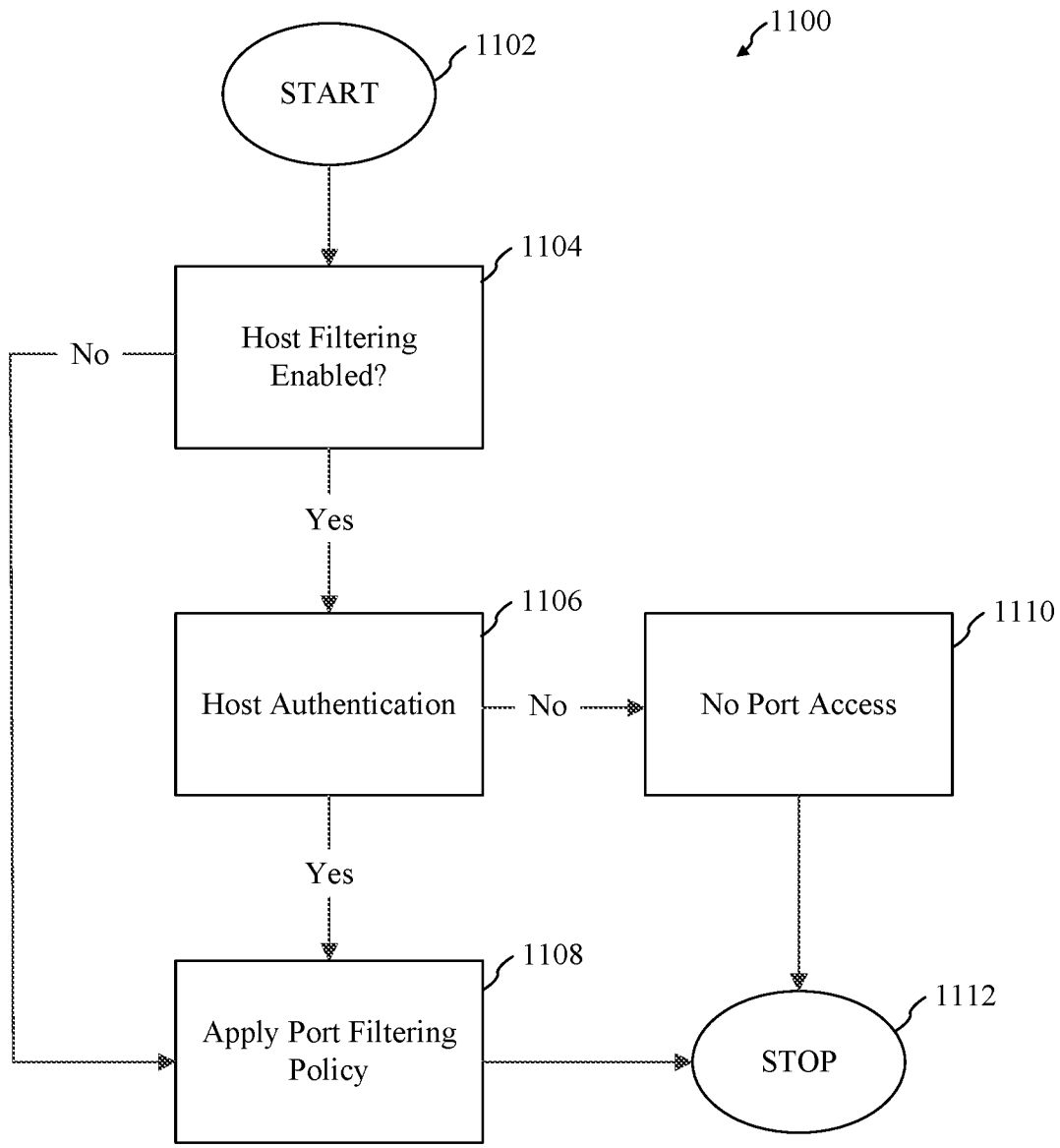
FIG. 11 depicts a flowchart of a method performed by an accessory device to determine which of multiple host access policies to apply with respect to a connected host computing device in accordance with an embodiment.

FIG. 11 depicts a flowchart 1100 of a method performed by a provisioned dock to determine which of two host access policies to apply with respect to a connected host computing device in accordance with one example embodiment.

As shown in FIG. 11, the method of flowchart 1100 is initiated at step 1102 after which control flows to step 1104, in which the dock determines whether host filtering is enabled for the dock. In one embodiment, this step may comprise the dock inspecting a binary indicator of whether host authentication should be performed by the dock (referred to elsewhere herein as bHostFilter) that is stored in non-volatile memory of the dock. If the dock determines that host filtering is not enabled, then control flows to step 1108, in which the dock applies a port filtering policy stored in its non-volatile memory, after which the method stops at step 1112. With reference to previously described embodiments, this means that the dock applies its authenticated host access policy.

However, if the dock determines in step 1104 that host filtering is not enabled, then control flows to step 1106 in which the dock authenticates the host computing device. One example method by which the dock may authenticate the host computing device is described below in reference to FIG. 12. If the host authentication is successful, then control flows to step 1108, in which the dock applies the port filtering policy stored in its non-volatile memory, after which the method stops at step 1112. However, if the host authentication fails, then control flows to step 1110 in which the dock applies a host access policy that denies access to all ports, after which the method stops at step 1112. With reference to previously described embodiments, this means that the dock applies its unauthenticated host access policy.

Although the authenticated host access policy referred to in FIG. 11 involves selectively allowing a host computing device to access ports based on a port filter policy and the unauthenticated host access policy involves denying host access to all ports of the dock, it will be appreciated that other authenticated and unauthenticated host access policies may be implemented. For example, the dock may store a first port filter policy for unauthenticated hosts and a second port filter policy for unauthenticated hosts.

Figure 12:
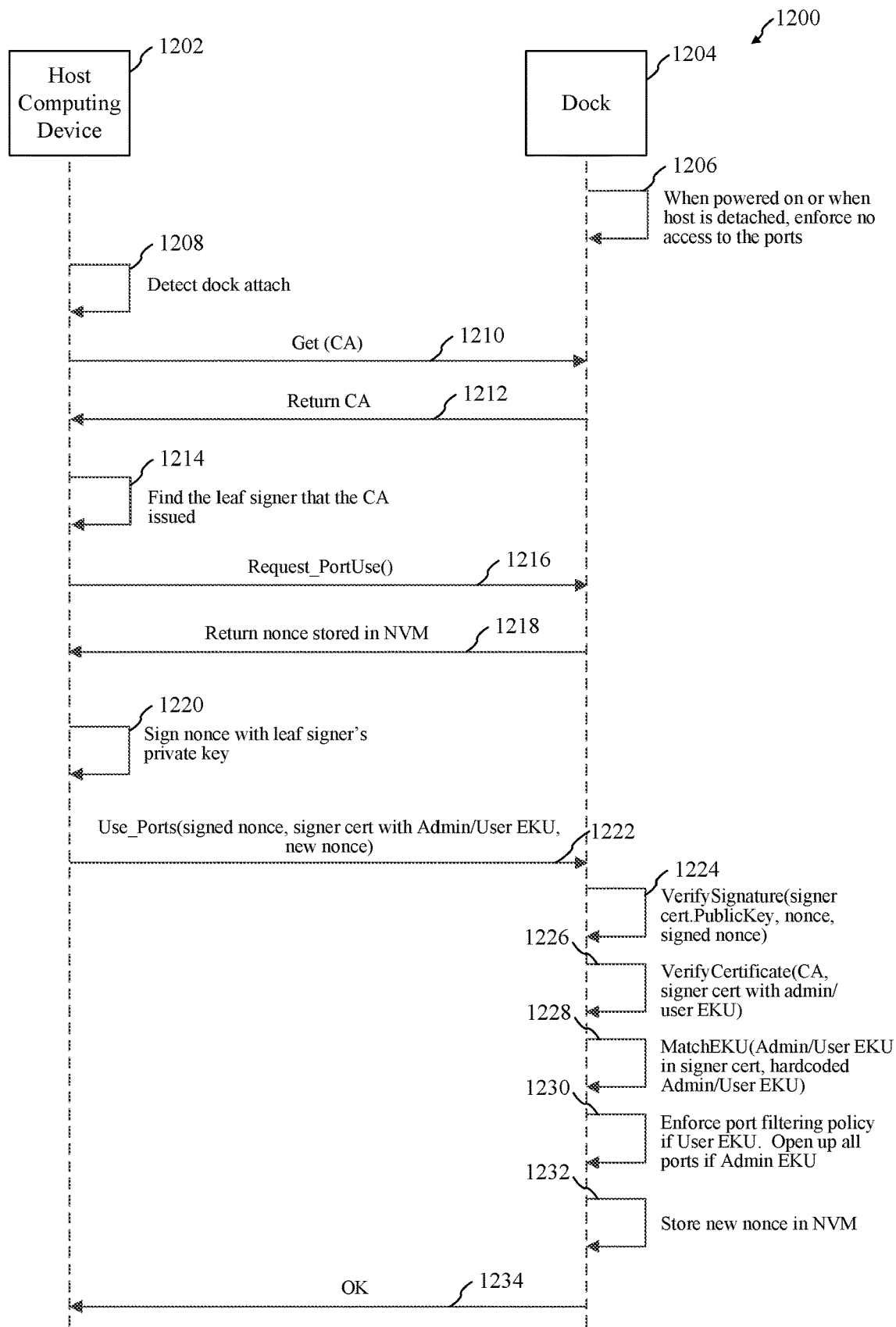
FIG. 12 depicts a sequence diagram that illustrates various interactions and operations that may occur when an accessory device is connected to a host computing device in accordance with an embodiment.

FIG. 12 depicts a sequence diagram 1200 that illustrates various interactions and operations that may occur when a dock 1204 is connected to a host computing device 1202 in accordance with an example embodiment.

As shown in FIG. 12, sequence diagram 1200 begins with dock 1204 enforcing a no access policy to all ports at power on or when a host computing device is detached therefrom (1206). For the purposes of this example, the no access policy is considered the unauthenticated host access policy.

When dock 1204 is connected to host computing device 1202, host computing device 1202 detects the attachment (1208). In response to detecting the attachment of dock 1204 (1208), host computing device issues a Get API call to dock 1204 (1210), the parameters of which may include the dock certificate authority (CA). In response to receiving the Get API call (1210), dock 1204 will return the dock certificate authority (CA) to host computing device 1202. Based on the identified certificate authority, host computing device will find the leaf signer that was issued by the certificate authority (1214). In accordance with embodiments, this will either be the signer of a provisioning administrator certificate or the signer of a host certificate. Each of these types of certificates were previously described.

Host computing device 1202 then issues a Request_PortUse API call to dock 1204 (1216), which may have no parameters associated therewith. In response to receiving the Request_PortUse API call, dock 1204 returns the nonce stored in its non-volatile memory to host computing device 1202 (1218). In response to receiving the nonce, host computing device 1202 signs the nonce with either its provisioning administrator private key or its host private key (1220), wherein the private key that is used depends on the results of prior step 1214. Host computing device 1202 then sends a Use_Ports API call to dock 1204 (1222), the parameters of which include the signed nonce, a signer certificate, and a new nonce. Depending on the outcome of step 1214, the signer certificate will either be a provisioning administrator certificate (which includes a provisioning administrator public key and an administrator EKU value) or a host certificate (which includes a host public key and a host EKU value).

In an alternate embodiment, host computing device 1202 signs both the old nonce and the new nonce with its provisioning administrator private key or its host private key and provides only signed versions of both nonces as parameters of the Use_Ports API call. This can help to prevent a scenario in which the Use_Ports API call is intercepted and the new nonce replaced by the old nonce, which could allow replay of an old Use_Ports API call that uses the old nonce. By signing the new nonce in this manner, host computing device 1202 can protect it from modification during a Use_Ports API call.

In response to receiving the Use_Ports API call from host computing device 1202 (1222), dock 1204 performs a number of operations. As shown in FIG. 12, dock 1204 uses the public key from the signer certificate to verify the digitally-signed nonce (1224). This may entail invoking a VerifySignature function whose parameters include the public key from the signer certificate, the nonce, and the digitally-signed nonce. The VerifySignature function may utilize the public key from the signer certificate to decrypt the digitally-signed nonce and then compare the result to the raw nonce and, if the two values match, the digitally-signed nonce is verified and the VerifySignature function succeeds. If the VerifySignature function fails, then the Use_Ports API call will also fail, and dock 1206 will apply the no access policy for all ports.

In response to receiving the Use_Ports API call from host computing device 1202 (1222), dock 1204 will also use the public key of the dock certificate authority to verify the signer certificate (1226). This may entail invoking a VerifyCertificate function whose parameters include the dock certificate authority and the signer certificate. The VerifyCertificate function may utilize the public key of the dock certificate authority to decrypt a digital signature included in the signer certificate and then compare the result to a hash of other contents of the signer certificate. If the two values match, then the signer certificate is verified and the VerifyCertificate function succeeds. If the VerifyCertificate function fails, then the Use_Ports API call will also fail, and dock 1204 will apply the no access policy for all ports.

In response to receiving the Use_Ports API call from host computing device 1202 (1222), dock 1204 will also determine whether an EKU value (either an administrator EKU value or a host EKU value) included in the signer certificate matches either an administrator EKU value or a host EKU value store in non-volatile memory of the dock (e.g., stored as part of a firmware image that is stored by the dock). This may include at least invoking a MatchEKU function whose parameters may include the EKU value from the signer certificate and either the administrator EKU value or the host EKU value stored in non-volatile memory.

If dock 1204 determines that the EKU value included in the signer certificate matches the host EKU value stored in non-volatile memory, then dock 1204 will apply the port filtering policy for authenticated hosts with respect to host computing device 1202 (1230). If dock 1204 determines that the EKU value included in the signer certificate matches the administrator EKU value stored in non-volatile memory, then dock 1204 will open up all ports for access by host computing device 1202 (1230). If dock 1204 determines that the EKU value included in the signer certificate does not match either of the host EKU value or the administrator EKU value stored in non-volatile memory, then the Use_Ports API call will fail, and dock 1204 will apply the no access policy for all ports.

The leveraging of the EKU attribute of the signer certificate to carry the administrator EKU value or host EKU value as discussed above advantageously enables additional authentication of host computing device 1202 without increasing the amount of communication between host computing device 1202 and dock 1204, since providing such information outside of the certificate would require a separate communication mechanism. Accordingly, leveraging the EKU attribute in this way conserves communication bandwidth between the two devices and reduces power consumption by each device.

Regardless of the success or failure of the Use_Ports API call, dock 1204 will store the new nonce provided with that call in non-volatile memory (1232), thereby refreshing the nonce.

Figure 13:
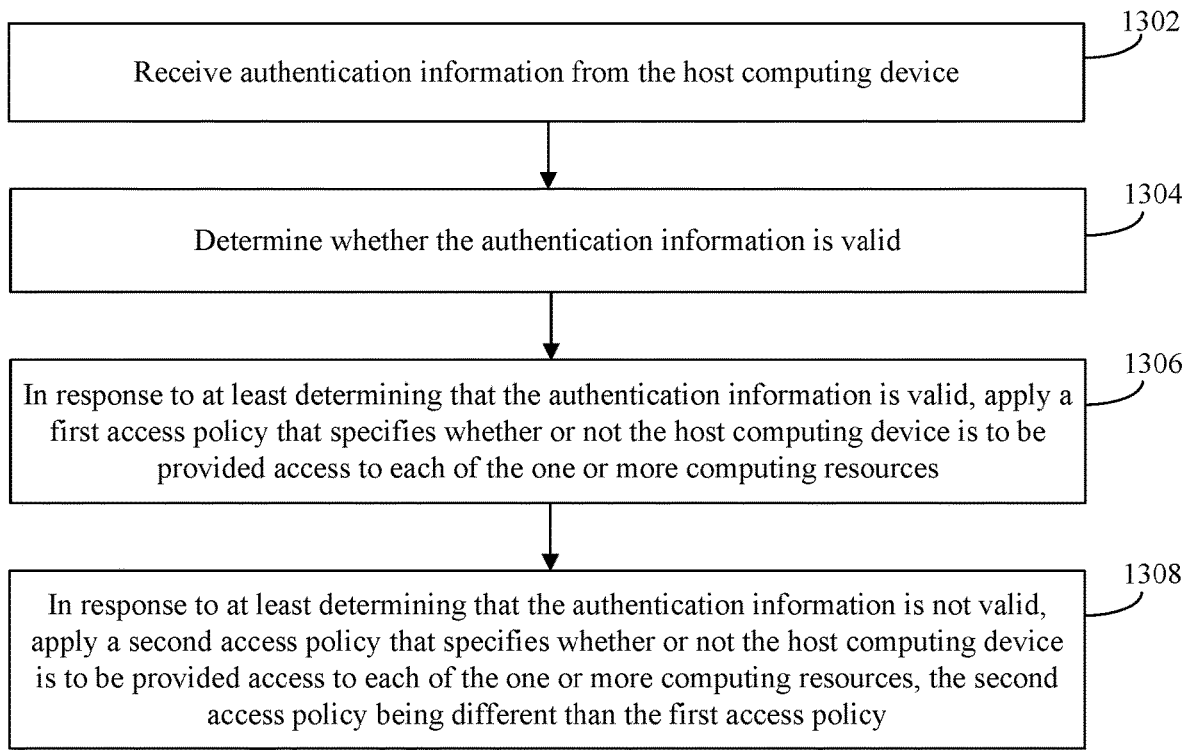
FIG. 13 is a flowchart of a method performed by an accessory device for determining which of multiple host access policies to apply with respect to a connected host computing device in accordance with an embodiment.

Based on the foregoing description, FIG. 13 presents a flowchart 1300 of a method performed by an accessory device that is connected to a host computing device and that is capable of providing access to one or more computing resources to the host computing device. In an embodiment, the accessory device comprises one of a docking station, a port replicator, a multimedia adapter, or a hub, although these are examples only and are not intended to be limiting. Furthermore, in an embodiment, the one or more computing resources comprise one or more of a USB port, an Ethernet port, a display port, or an audio port, although these are examples only and not intended to be limiting.

In an embodiment, the steps of flowchart 1300 are performed in response to determining that the accessory device has been configured to perform host authentication.

As shown in FIG. 13, the method begins at step 1302 in which the accessory device receives authentication information from the host computing device. At step 1304, the accessory device determines whether the authentication information is valid.

In one embodiment, the authentication information comprises a host certificate and determining whether the authentication information is valid comprises verifying a digital signature of the host certificate using a public key of a certificate authority that has been provisioned to the accessory device. In a further embodiment, the host certificate contains a public key, the authentication information further comprises a digitally-signed nonce and determining whether the authentication information is valid further comprises verifying the digitally-signed nonce using the public key contained in the host certificate. In a still further embodiment, the host certificate contains an EKU value and determining whether the authentication information is valid further comprises comparing the EKU value contained in the host certificate to an EKU value that is stored on the accessory device.

At step 1306, in response to at least determining that the authentication information is valid, the accessory device applies a first access policy that specifies whether or not the host computing device is to be provided access to each of the one or more computing resources.

As step 1308, in response to at least determining that the authentication information is not valid, the accessory device applies a second access policy that specifies whether or not the host computing device is to be provided access to each of the one or more computing resources, the second access policy being different than the first access policy. In an embodiment, the second access policy comprises a default access policy of the accessory device.

In one embodiment of flowchart 1300, the one or more computing resources comprise multiple computing resources and at least one of the first access policy and the second access policy specifies that the host computing device is to be provided access to some but not all of the multiple computing resources.

In another embodiment of flowchart 1300, the one or more computing resources comprise multiple computing resources and the first access policy specifies that the host computing device is to be provided access to a first set of the multiple computing resources and the second access policy specifies that the host computing device is to be provided access to a second set of the multiple computing resources, wherein the second set is a subset of the first set that is smaller than the first set. Alternatively, the first set may be a subset of the second set that is smaller than the second set. Still further, the first set and the second set may be non-overlapping or partially overlapping.

Figure 14:
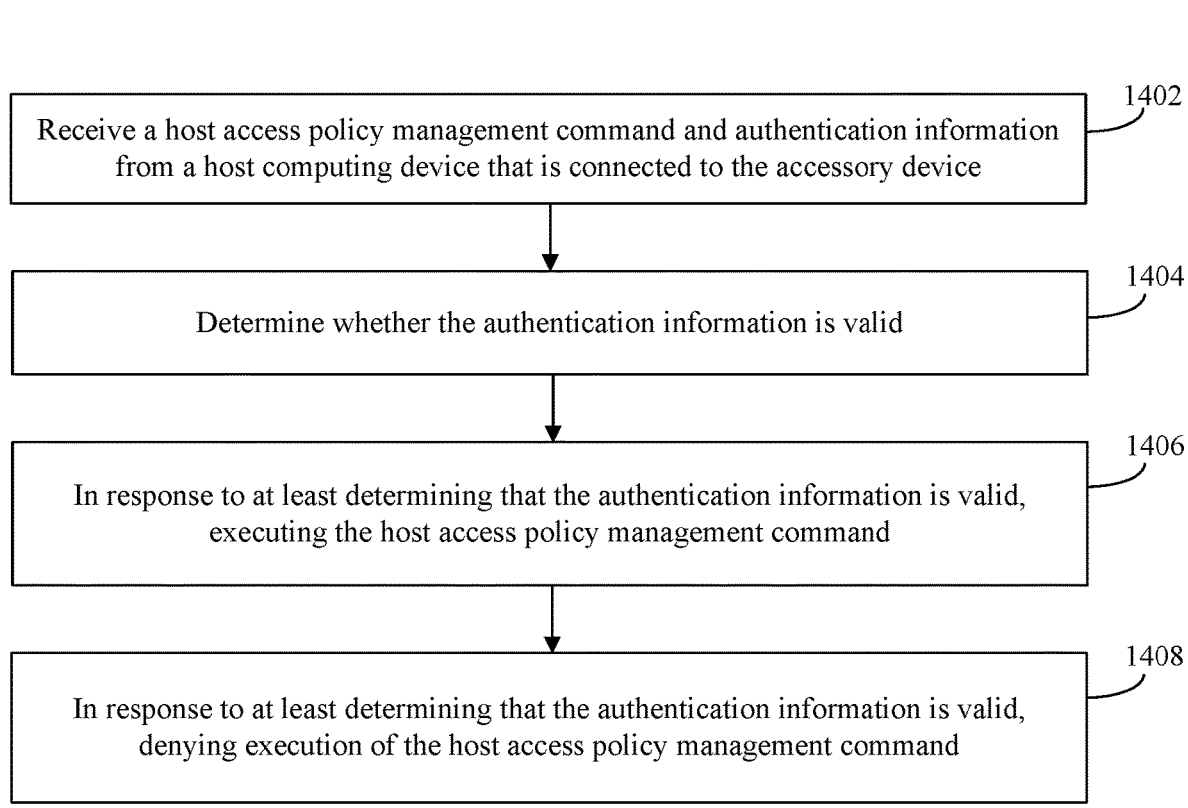
FIG. 14 is a flowchart of a method performed by an accessory device for determining whether or not to execute a host access policy management command received from a connected host computing device in accordance with an embodiment.

Based on the foregoing description, FIG. 14 presents a flowchart 1400 of a method performed by an accessory device for determining whether or not to execute a host access policy management command received from a connected host computing device in accordance with an embodiment. In an embodiment, the accessory device comprises one of a docking station, a port replicator, a multimedia adapter, or a hub, although these are examples only and are not intended to be limiting.

As shown in FIG. 14, the method of flowchart 1400 begins as step 1402, in which the accessory device receives a host access policy management command and authentication information from a host computing device that is connected to the accessory device. The host access policy management command indicates that a host access policy be set on, modified on, or removed from the accessory device. The host access policy specifies whether a host computing device that is subsequently connected to the accessory device is to be provided access to each of one or more computing resources accessible to the accessory device. In an embodiment, the one or more computing resources comprise one or more of a USB port, an Ethernet port, a display port, or an audio port, although these are examples only and not intended to be limiting.

At step 1404, the accessory device determines whether the authentication information is valid. In an embodiment, the authentication information comprises an administrator certificate, and determining whether the authentication information is valid comprises verifying a digital signature of the administrator certificate using a public key of a certificate authority that has been provisioned to the accessory device. In a further embodiment in which the administrator certificate contains a public key and the authentication information further comprises a digitally-signed nonce, determining whether the authentication information is valid further comprises verifying the digitally-signed nonce using the public key contained in the administrator certificate. In a still further embodiment, the administrator certificate contains an EKU value and determining whether the authentication information is valid further comprises comparing the EKU value contained in the administrator certificate to an EKU value that is stored on the accessory device. In yet another embodiment, the authentication information comprises an identifier of the accessory device and determining whether the authentication information is valid comprises comparing the identifier of the accessory device included in the authentication information to an identifier of the accessory device that is stored on the accessory device and is not programmatically queryable by any external device.

At step 1406, in response to at least determining that the authentication information is valid, the accessory device executes the host access policy management command.

At step 1408, in response to at least determining that the authentication information is not valid, the accessory device denies execution of the host access policy management command.

In one embodiment of flowchart 1400, the host access policy comprises a first host access policy that is applied by the accessory device for authenticated host computing devices and a second host access policy that is applied by the accessory device for non-authenticated host computing devices.

In a further embodiment of flowchart 1400 in which the one or more computing resources comprise multiple computing resources, at least one of the first access policy and the second access policy specifies that the host computing device is to be provided access to some but not all of the multiple computing resources.

In a still further embodiment of flowchart 1400 in which the one or more computing resources comprise multiple computing resources, the first access policy specifies that the host computing device is to be provided access to a first set of the multiple computing resources and the second access policy specifies that the host computing device is to be provided access to a second set of the multiple computing resources, wherein the second set is a subset of the first set that is smaller than the first set.

Figure 15:
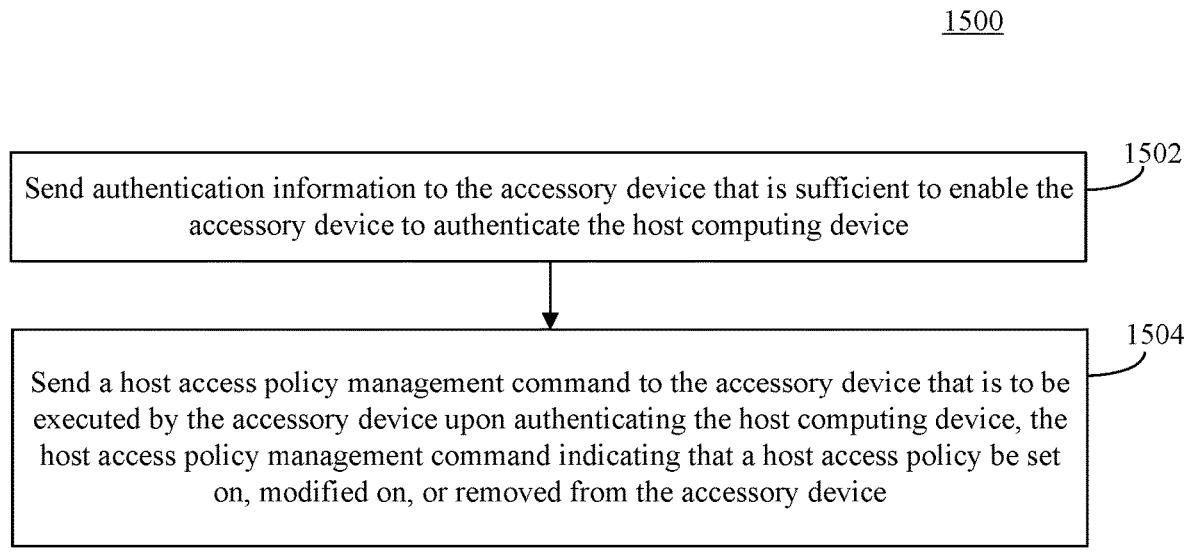
FIG. 15 is a flowchart of a method performed by a host computing device for setting or modifying a host access policy on an attached accessory device or removing a host access policy therefrom, in accordance with an embodiment.

FIG. 15 is a flowchart of a method performed by a host computing device for setting or modifying a host access policy on an attached accessory device or removing a host access policy therefrom, in accordance with an embodiment.

As shown in FIG. 15, the method of flowchart 1500 begins at step 1502, in which the host computing device sends authentication information to the accessory device that is sufficient to enable the accessory device to authenticate the host computing device.

At step 1504, the host computing device sends a host access policy management command to the accessory device that is to be executed by the accessory device upon authenticating the host computing device. Such host access policy management command may be sent to the accessory device before or after the sending of the aforementioned authentication information, or substantially concurrently therewith (e.g., as part of a same or different API call). The host access policy management command indicates that a host access policy be set on, modified on, or removed from the accessory device. The host access policy specifies whether a host computing device that is subsequently connected to the accessory device should be provided with access to each of one or more computing resources accessible to the accessory device.

Figure 16:
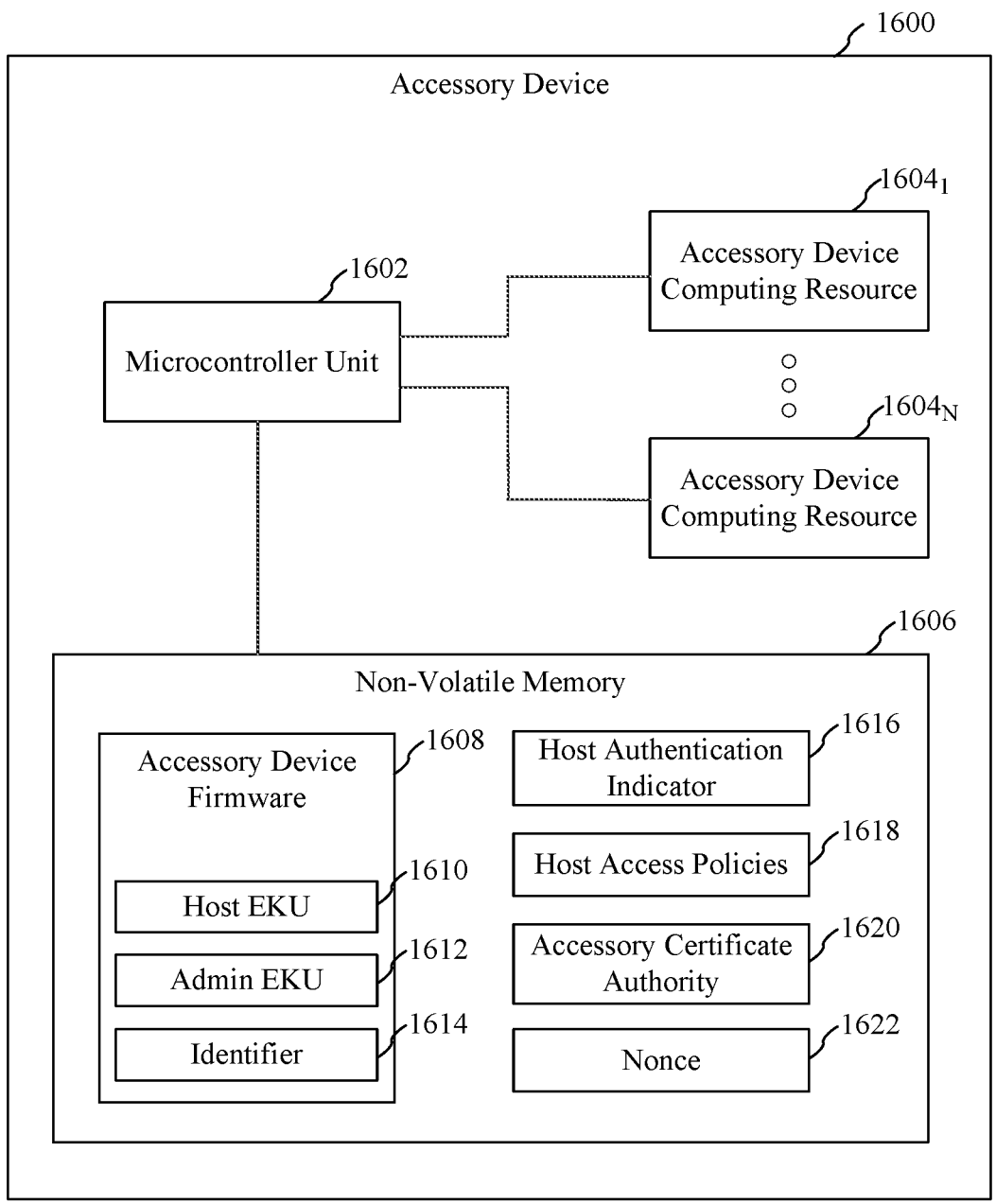
FIG. 16 is a block diagram of an example accessory device that is capable of applying different host access policies for authenticated and unauthenticated hosts in accordance with an embodiment.

FIG. 16 is a block diagram of an example accessory device 1600 that is capable of applying different host access policies for authenticated and unauthenticated hosts in accordance with an embodiment. As shown in FIG. 16, accessory device 1600 includes a microcontroller unit (MCU) 1602, a plurality of accessory device computing resources $1604_1$-$1604_N$, and non-volatile memory 1606. As further shown in FIG. 16, MCU 1602 is connected to each of accessory device computing resources $1604_1$-$1604_N$ and to non-volatile memory 1606. In an embodiment, accessory device 1600 comprises a docking station (dock) and each of $1604_1$-$1604_N$ comprises a port, although as noted above, the techniques described herein are applicable to any type of accessory device and any type of computing resource.

As further shown in FIG. 16, non-volatile memory 1606 stores accessory device firmware 1602 which is executed by MCU 1602 to perform various operations of accessory device 1600. Accessory device firmware includes a host EKU 1610, an administrator EKU 1612, and an identifier (ID) 1614 of accessory device that is not queryable by any external device. Non-volatile memory 1606 also stores a host authentication indicator 1616, which may comprise a binary indicator of whether host authentication should be performed by accessory device 1600, a set of host access policies 1618, which may comprise an unauthenticated host access policy and an authenticated host access policy, an accessory certificate authority 1620 and a cryptographic nonce 1622.

MCU 1602 may execute accessory device firmware 1606 to perform any of the operations described herein that are attributed to any of accessory devices $108_1$-$108_N$, dock 904, dock 1004, and dock 1204, as well as any of the steps of flowchart 1100 of FIG. 11, flowchart 1300 of FIG. 13 and flowchart 1400 of FIG. 14. The foregoing description provides an explanation of how MCU 1602 may utilize each of the elements stored in non-volatile memory 1606 to accept provisioning from an authenticated host computing device and to selectively apply a host access policy to authenticated and unauthenticated host computing devices, and thus will not be repeated here for the sake of brevity. When a host access policy is applied that requires MCU 1602 to enable or disable one of accessory device computing resources $1604_1$-$1604_N$, MCU 1602 may carry out such enabling/disabling, for example, by selectively enabling or disabling firmware and/or a chipset associated with each resource.

Figure 17:
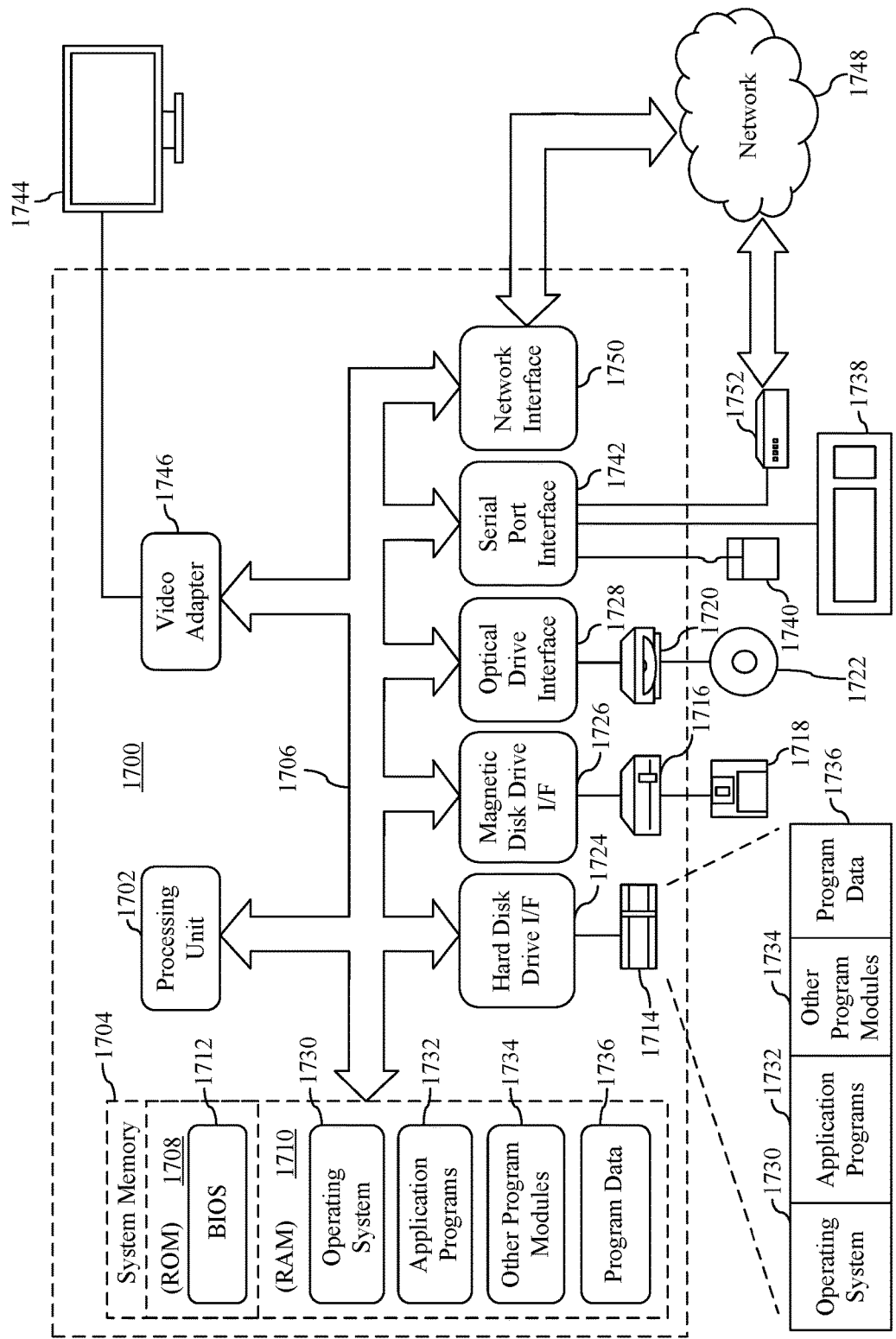
FIG. 17 depicts an example processor-based computer system that may be used to implement various embodiments described herein.

FIG. 17 depicts an example processor-based computer system 1700 that may be used to implement various embodiments described herein, including administrator computing device computing device 102, any of host computing devices $106_1$-$106_N$, host computing device 700, host computing device 902, host computing device 1002, and host computing device 1202. System 1700 may also be used to implement provisioning sequence 800 of FIG. 8A, authentication sequence 850 of FIG. 8B, and flowchart 1500 of FIG. 15. The description of system 1700 provided herein is provided for purposes of illustration and is not intended to be limiting. Embodiments may be implemented in further types of computer systems, as would be known to persons skilled in the relevant art(s).

As shown in FIG. 17, system 1700 includes a processing unit 1702, a system memory 1704, and a bus 1706 that couples various system components including system memory 1704 to processing unit 1702. Processing unit 1702 may comprise one or more microprocessors or microprocessor cores. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random-access memory (RAM) 1710. A basic input/output system 1712 (BIOS) is stored in ROM 1708.

System 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, BLU-RAY™ disk or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 1730, one or more application programs 1732, other program modules 1734, and program data 1736. In accordance with various embodiments, the program modules may include computer program logic that is executable by processing unit 1702 to perform any or all the functions and features of administrator computing device computing device 102, any of host computing devices 1061-106N, host computing device 700, host computing device 902, host computing device 1002, and host computing device 1202 as described above. The program modules may also include computer program logic that, when executed by processing unit 1702, implement provisioning sequence 800 of FIG. 8A, authentication sequence 850 of FIG. 8B, or flowchart 1500 of FIG. 15, as described above.

A user may enter commands and information into system 1700 through input devices such as a keyboard 1738 and a pointing device 1740. Other input devices (not shown) may include a microphone, joystick, game controller, scanner, or the like. In one embodiment, a touch screen is provided in conjunction with a display 1744 to allow a user to provide user input via the application of a touch (as by a finger or stylus for example) to one or more points on the touch screen. These and other input devices are often connected to processing unit 1702 through a serial port interface 1742 that is coupled to bus 1706, but may be connected by other interfaces, such as a parallel port, game port, or a Universal Serial Bus (USB). Such interfaces may be wired or wireless interfaces.

A display 1744 is also connected to bus 1706 via an interface, such as a video adapter 1746. In addition to display 1744, system 1700 may include other peripheral output devices (not shown) such as speakers and printers.

System 1700 is connected to a network 1748 (e.g., a local area network or wide area network such as the Internet) through a network interface or adapter 1750, a modem 1752, or other suitable means for establishing communications over the network. Modem 1752, which may be internal or external, is connected to bus 1706 via serial port interface 1742. As used herein, the terms "computer program medium," "computer-readable medium," and "computer-readable storage medium" are used to generally refer to memory devices or storage structures such as the hard disk associated with hard disk drive 1714, removable magnetic disk 1718, removable optical disk 1722, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1732 and other program modules 1734) may be stored on the hard disk, magnetic disk, optical disk, ROM, or RAM. Such computer programs may also be received via network interface 1750, serial port interface 1742, or any other interface type. Such computer programs, when executed or loaded by an application, enable system 1700 to implement features of embodiments of the present methods and systems described herein. Accordingly, such computer programs represent controllers of the system 1700.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In the foregoing description, reference is made to embodiments in which two host access policies are provisioned to an accessary device. However, it is to be understood that in other embodiments, more than two host access policies may be provisioned to an accessory device. For example, in one embodiment, an accessory device may be provisioned with an unauthenticated host access policy and more than one authenticated host access policy, wherein each authenticated host access policy provides for varying degrees of host access to attached resources. Generally speaking, any number of host access policies may be provisioned to an accessory device, each of which may be triggered based on the results of authenticating an attached host computing device, and each of which may provide different levels of access to accessory computing resources.

Also, in certain embodiments described herein, provisioning and configuration of an accessory device is handled by a host computing device that acts as an intermediary between an administrator computing device and the accessory device. However, in other embodiments, the provisioning and configuration of the accessory device may be carried out directly without requiring an intermediary host computing device. For example, in an embodiment, provisioning may be carried out via direct network communication with the accessory device (e.g., cloud communication with an Internet of Things (IOT)/Smart dock).

Furthermore, in certain embodiments described herein, authentication of the host computing device involves using a particular certificate authentication process. However, it is to be understood that numerous other processes may be used to authenticate a host computing device and that the embodiments described herein are not limited to a particular type of host authentication process.

Finally, although numerous embodiments described herein discuss policies that grant or deny access to computing resources of an accessory device, it should also be understood that the techniques described herein may also be applied to selectively adjust certain behaviors of such computing resources. For example, and without limitation, a policy applied to a first host may cause a sensitivity of a mouse to be adjusted to match preferences aligned with a user of the first host, while a policy applied to a second host may cause the sensitivity of the mouse to be adjusted to match preferences aligned with a user of the second host.

III. Additional Exemplary Embodiments

A method is described herein that is performed by an accessory device that is connected to a host computing device and that is capable of providing access to one or more computing resources to the host computing device. The method comprises: receiving authentication information from the host computing device; determining whether the authentication information is valid; in response to at least determining that the authentication information is valid, applying a first access policy that specifies whether or not the host computing device is to be provided access to each of the one or more computing resources; and in response to at least determining that the authentication information is not valid, applying a second access policy that specifies whether or not the host computing device is to be provided access to each of the one or more computing resources, the second access policy being different than the first access policy.

In one embodiment of the foregoing method, the authentication information comprises a host certificate and determining whether the authentication information is valid comprises verifying a digital signature of the host certificate using a public key of a certificate authority that has been provisioned to the accessory device.

In further accordance with this embodiment, the host certificate contains a public key, the authentication information further comprises a digitally-signed nonce and determining whether the authentication information is valid further comprises verifying the digitally-signed nonce using the public key contained in the host certificate.

In still further accordance with this embodiment, the host certificate contains an EKU value and determining whether the authentication information is valid further comprises comparing the EKU value contained in the host certificate to an EKU value that is stored on the accessory device.

In another embodiment of the foregoing method, the accessory device comprises one of a docking station, a port replicator, a multimedia adapter, or a hub.

In yet another embodiment of the foregoing method, the one or more computing resources comprise one or more of a Universal Serial Bus (USB) port; an Ethernet port; a display port; or an audio port.

In still another embodiment of the foregoing method, the receiving, determining and applying steps are performed in response to determining that the accessory device has been configured to perform host authentication.

In a further embodiment of the foregoing method, the one or more computing resources comprise multiple computing resources and at least one of the first access policy and the second access policy specifies that the host computing device is to be provided access to some but not all of the multiple computing resources.

In a still further embodiment of the foregoing method, the one or more computing resources comprise multiple computing resources, the first access policy specifies that the host computing device is to be provided access to a first set of the multiple computing resources, and the second access policy specifies that the host computing device is to be provided access to a second set of the multiple computing resources, wherein the second set is a subset of the first set that is smaller than the first set.

A method performed by an accessory device is described herein. The method comprises receiving a host access policy management command and authentication information from a host computing device that is connected to the accessory device, the host access policy management command indicating that a host access policy be set on, modified on, or removed from the accessory device; determining whether the authentication information is valid; in response to at least determining that the authentication information is valid, executing the host access policy management command; and in response to at least determining that the authentication information is not valid, denying execution of the host access policy management command. The host access policy specifies whether a host computing device that is subsequently connected to the accessory device is to be provided access to each of one or more computing resources accessible to the accessory device.

In one embodiment of the foregoing method, the authentication information comprises an administrator certificate and determining whether the authentication information is valid comprises verifying a digital signature of the administrator certificate using a public key of a certificate authority that has been provisioned to the accessory device.

In further accordance with this embodiment, the administrator certificate contains a public key, the authentication information further comprises a digitally-signed nonce and determining whether the authentication information is valid further comprises verifying the digitally-signed nonce using the public key contained in the administrator certificate.

In still further accordance with this embodiment, the administrator certificate contains an EKU value and determining whether the authentication information is valid further comprises comparing the EKU value contained in the administrator certificate to an EKU value that is stored on the accessory device.

In another embodiment of the foregoing method, the authentication information comprises an identifier of the accessory device and determining whether the authentication information is valid comprises comparing the identifier of the accessory device included in the authentication information to an identifier of the accessory device that is stored on the accessory device and is not programmatically queryable by any external device.

In yet another embodiment of the foregoing method, the accessory device comprises a docking station, a port replicator, a multimedia adapter, or a hub.

In still another embodiment of the foregoing method, the one or more computing resources comprise one or more of a Universal Serial Bus (USB) port; an Ethernet port; a display port; or an audio port.

In a further embodiment of the foregoing method, the host access policy comprises a first host access policy that is applied by the accessory device for authenticated host computing devices and a second host access policy that is applied by the accessory device for non-authenticated host computing devices.

In further accordance with this embodiment, the one or more computing resources comprise multiple computing resources and wherein at least one of the first access policy and the second access policy specifies that the host computing device is to be provided access to some but not all of the multiple computing resources.

In still further accordance with this embodiment, the one or more computing resources comprise multiple computing resources and the first access policy specifies that the host computing device is to be provided access to a first set of the multiple computing resources and the second access policy specifies that the host computing device is to be provided access to a second set of the multiple computing resources, wherein the second set is a subset of the first set that is smaller than the first set.

A method performed by a host computing device that is connected to an accessory device is described herein. The method comprises: sending authentication information to the accessory device that is sufficient to enable the accessory device to authenticate the host computing device; and sending a host access policy management command to the accessory device that is to be executed by the accessory device upon authenticating the host computing device, the host access policy management command indicating that a host access policy be set on, modified on, or removed from the accessory device, the host access policy specifying whether a host computing device that is subsequently connected to the accessory device should be provided with access to each of one or more computing resources accessible to the accessory device.

IV. Conclusion

While various embodiments of the present methods and systems have been described above, they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments but should be defined only in accordance with the following claims and their equivalents.

What is claimed is:

1. A method performed by an accessory device that is connected to a host computing device and that is capable of providing access to one or more computing resources to the host computing device, the method comprising:
   providing a nonce stored in a non-volatile memory of the accessory device to the host computing device;
   receiving authentication information comprising a host certificate and a digitally-signed version of the nonce from the host computing device;
   determining whether the authentication information is valid by:
      verifying a digital signature of the host certificate using a first public key of a certificate authority that has been provisioned to the accessory device; and
      verifying the digitally-signed version of the nonce using a second public key contained in the host certificate;
   in response to at least determining that the authentication information is valid, applying a first access policy that specifies whether or not the host computing device is to be provided access to each of the one or more computing resources; and
   in response to at least determining that the authentication information is not valid, applying a second access policy that specifies whether or not the host computing device is to be provided access to each of the one or more computing resources, the second access policy being different than the first access policy.

2. The method of claim 1, wherein the host certificate contains an Extended Key Usage (EKU) value and wherein determining whether the authentication information is valid further comprises:
   comparing the EKU value contained in the host certificate to an EKU value that is stored on the accessory device.

3. The method of claim 1, wherein the accessory device comprises one of a docking station, a port replicator, a multimedia adapter, or a hub.

4. The method of claim 1, wherein the one or more computing resources comprise one or more of:
   a Universal Serial Bus (USB) port;
   an Ethernet port;
   a display port; or
   an audio port.

5. The method of claim 1, wherein the receiving, determining and applying steps are performed in response to determining that the accessory device has been configured to perform host authentication.

6. The method of claim 1, wherein the one or more computing resources comprise multiple computing resources and wherein at least one of the first access policy and the second access policy specifies that the host computing device is to be provided access to some but not all of the multiple computing resources.

7. The method of claim 1, wherein the one or more computing resources comprise multiple computing resources and wherein the first access policy specifies that the host computing device is to be provided access to a first set of the multiple computing resources and the second access policy specifies that the host computing device is to be provided access to a second set of the multiple computing resources, wherein the second set is a subset of the first set that is smaller than the first set.

8. An accessory device capable of providing access to one or more computing resources to a host computing device connected thereto, comprising:
   a non-volatile memory configured to store a nonce; and
   a microcontroller unit configured to:
      provide the nonce stored in the non-volatile memory to the host computing device;
      receive authentication information comprising a host certificate and a digitally-signed version of the nonce from the host computing device;
      determine whether the authentication information is valid by:
         verifying a digital signature of the host certificate using a first public key of a certificate authority that has been provisioned to the accessory device; and
         verifying the digitally-signed version of the nonce using a second public key contained in the host certificate;
      in response to at least a determination that the authentication information is valid, apply a first access policy that specifies whether or not the host computing device is to be provided access to each of the one or more computing resources; and
      in response to at least a determination that the authentication information is not valid, apply a second access policy that specifies whether or not the host computing device is to be provided access to each of the one or more computing resources, the second access policy being different than the first access policy.

9. The accessory device of claim 8, wherein the host certificate contains an Extended Key Usage (EKU) value and wherein determining whether the authentication information is valid further comprises:

comparing the EKU value contained in the host certificate to an EKU value that is stored on the accessory device.

10. The accessory device of claim 8, wherein the accessory device comprises one of a docking station, a port replicator, a multimedia adapter, or a hub.

11. The accessory device of claim 8, wherein the one or more computing resources comprise one or more of:
    a Universal Serial Bus (USB) port;
    an Ethernet port;
    a display port; or
    an audio port.

12. The accessory device of claim 8, wherein the microcontroller unit is configured to receive the authentication information and determine whether the authentication information is valid in response to a determination that the accessory device has been configured to perform host authentication.

13. The accessory device of claim 8, wherein the one or more computing resources comprise multiple computing resources and wherein at least one of the first access policy and the second access policy specifies that the host computing device is to be provided access to some but not all of the multiple computing resources.

14. The accessory device of claim 8, wherein the one or more computing resources comprise multiple computing resources and wherein the first access policy specifies that the host computing device is to be provided access to a first set of the multiple computing resources and the second access policy specifies that the host computing device is to be provided access to a second set of the multiple computing resources, wherein the second set is a subset of the first set that is smaller than the first set.

15. A computer-readable storage medium having program instructions recorded thereon that, when executed by a microcontroller unit of an accessory device that is capable of providing access to one or more computing resources to a host computing device connected thereto, perform a method, the method comprising:

providing a nonce stored in the computer-readable storage medium of the accessory device to the host computing device;

receiving authentication information comprising a host certificate and a digitally-signed version of the nonce from the host computing device;

determining whether the authentication information is valid by:
  verifying a digital signature of the host certificate using a first public key of a certificate authority that has been provisioned to the accessory device; and
  verifying the digitally-signed version of the nonce using a second public key contained in the host certificate;

in response to at least determining that the authentication information is valid, applying a first access policy that specifies whether or not the host computing device is to be provided access to each of the one or more computing resources; and in response to at least determining that the authentication information is not valid, applying a second access policy that specifies whether or not the host computing device is to be provided access to each of the one or more computing resources, the second access policy being different than the first access policy.

16. The computer-readable storage medium of claim 15, wherein the host certificate contains an Extended Key Usage (EKU) value and wherein determining whether the authentication information is valid further comprises:

comparing the EKU value contained in the host certificate to an EKU value that is stored on the accessory device.

17. The computer-readable storage medium of claim 15, wherein the accessory device comprises one of a docking station, a port replicator, a multimedia adapter, or a hub.

18. The computer-readable storage medium of claim 15, wherein the one or more computing resources comprise one or more of:
    a Universal Serial Bus (USB) port;
    an Ethernet port;
    a display port; or
    an audio port.

19. The computer-readable storage medium of claim 15, wherein the receiving, determining and applying steps are performed in response to determining that the accessory device has been configured to perform host authentication.

20. The computer-readable storage medium of claim 15, wherein the one or more computing resources comprise multiple computing resources and wherein at least one of the first access policy and the second access policy specifies that the host computing device is to be provided access to some but not all of the multiple computing resources.

* * * * *